United States Patent

Hirose et al.

[11] Patent Number: 6,064,890
[45] Date of Patent: May 16, 2000

[54] MOBILE COMMUNICATION APPARATUS WITH IMPROVED BASE STATION MONITORING

[75] Inventors: Takako Hirose, Hirakata; Yasunori Tanaka, Takatsuki; Takayuki Hamaki, Hirakata; Jun Yamaguchi, Kadoma, all of Japan

[73] Assignee: Matsushita Electric Industrial Co., Ltd., Osaka, Japan

[21] Appl. No.: 08/997,675

[22] Filed: Dec. 23, 1997

[30] Foreign Application Priority Data

Dec. 27, 1996 [JP] Japan ................................ 8-350907

[51] Int. Cl.[7] ................................................. H04B 7/00
[52] U.S. Cl. ............................ 455/513; 455/525; 455/62
[58] Field of Search .................................... 455/450, 451, 455/452, 309, 513, 62, 67.1, 434, 464, 453, 525

[56] References Cited

U.S. PATENT DOCUMENTS

| | | |
|---|---|---|
| 4,365,347 | 12/1982 | Otsuka et al. . |
| 4,670,899 | 6/1987 | Brody et al. .............................. 455/453 |
| 5,212,804 | 5/1993 | Choate .................................... 455/431 |
| 5,309,503 | 5/1994 | Bruckert et al. ......................... 455/452 |
| 5,603,085 | 2/1997 | Shedlo .................................... 455/450 |
| 5,623,422 | 4/1997 | Williams ................................. 709/240 |
| 5,737,705 | 4/1998 | Ruppel et al. ........................... 455/452 |
| 5,809,430 | 9/1998 | D'Amico ................................. 455/525 |
| 5,903,843 | 5/1999 | Suzuki et al. ............................ 455/452 |

*Primary Examiner*—Reinhard J. Eisenzopf
*Assistant Examiner*—Charles N. Appiah
*Attorney, Agent, or Firm*—Price Gess & Ubell

[57] ABSTRACT

In order to detect a base station for a call connect or handover in almost real time while a mobile communication apparatus is moving, the measured base station selecting unit 110 refers to the measured base station table 101 and selects a next base station to be measured. The measuring unit 111 measures the signal quality for the selected base station. The measuring result judging unit 112 compares the measured signal quality with a predetermined threshold and judges whether the measurement of the signal quality of the present base station should be continued or whether a switch to measuring a next base station should be performed. The periphery base station table updating unit 113 rearranges the content of the periphery base station table 102 in descending order of signal quality, based on the information stored in the periphery base station table 102 and on the averages of the signal quality measurements.

13 Claims, 20 Drawing Sheets

FIG. 15

MEASURED BASE STATION TABLE

| BASE STATION |
|---|
| $f1$ MHz |
| $f2$ MHz |
| $f3$ MHz |
| $f4$ MHz |
| $f5$ MHz |
| $f6$ MHz |
| $f7$ MHz |
| $f8$ MHz |
| $f9$ MHz |
| $f10$ MHz |
| · |
| · |
| · |
| $f46$ MHz |
| $f47$ MHz |
| $f48$ MHz |
| $f49$ MHz |
| $f50$ MHz |

FIG. 16

PERIPHERAL BASE STATION TABLE

| BASE STATION | RSSI | QI |
|---|---|---|
| f1  MHz | R1dB | Q1dB |
| f3  MHz | R3dB | Q3dB |
| f4  MHz | R4dB | Q4dB |
| f6  MHz | R6dB | Q6dB |
| f9  MHz | R9dB | Q9dB |
| f10  MHz | R10dB | Q10dB |
| ⋮ | ⋮ | ⋮ |
| f46  MHz | R46dB | Q46dB |
| f47  MHz | R47dB | Q47dB |
| f49  MHz | R49dB | Q49dB |

FIG. 19

NON-MEASURED BASE STATION TABLE

| BASE STATION | NON-MEASURED DURATION |
|---|---|
| f2 MHz | T2 msec |
| f5 MHz | T5 msec |
| f7 MHz | T7 msec |
| f8 MHz | T8 msec |
| ⋮ | ⋮ |
| f50 MHz | T50 msec |

FIG. 20

PERIPHERAL BASE STATION TABLE

| BASE STATION | RSSI | QI | CHANGE IN LEVEL |
|---|---|---|---|
| f1 MHz | R1dB | Q1dB | △01 |
| f3 MHz | R3dB | Q3dB | △02 |
| f4 MHz | R4dB | Q4dB | △03 |
| f6 MHz | R6dB | Q6dB | △04 |
| f9 MHz | R9dB | Q9dB | |
| f10 MHz | R10dB | Q10dB | |
| ⋮ | ⋮ | ⋮ | |
| f46 MHz | R46dB | Q46dB | |
| f47 MHz | R47dB | Q47dB | |
| f49 MHz | R49dB | Q49dB | |

MOBILE COMMUNICATION APPARATUS WITH IMPROVED BASE STATION MONITORING

BACKGROUND OF THE INVENTION

1. Field of the Invention

The present invention relates to a mobile communication apparatus, used in a mobile communication system, which monitors the signal quality of peripheral base stations and makes an improved selection of a channel to be used in communication.

2. Description of the Related Art

As information has become increasingly important in modern society, much attention has been focused on mobile communication systems that have both a fast response and superior functioning. Such systems have taken various forms, such as portable phones and car phones. At present, there is a general trend in the field of mobile communication away from analog methods to digital methods, so that more efficient use of radio frequencies can be achieved while allowing the realization of various forms of high-quality, low-cost communication.

One example of a digital mobile communication service that is already in operation is the Personal Handyphone System (hereinafter "PHS") used in Japan. A very similar radio communication system called PACS (Personal Access Communications System) has also been standardized as a PCS (Personal Communications Service) in the USA. Under PACS, radio access is performed according to a TDMA (Time Division Multiple Access) method, while transfer is achieved according to an FDD (Frequency Division Duplexing) method and modulation according to a DQPSK method. Under PHS, meanwhile, a TDMA-TDD (Time Division Multiple Access-Time Division Duplexing) method is used.

Like the PHS method used in Japan, the service area for a PACS system is formed of a large number of radio zones. As a result, it is necessary to provide a handover function, whereby a mobile communication station can switch from communicating via a first base station to communicating via a second base station, for times when a mobile communication station in communication with the first base station approaches the radio zone of the second base station, or when a mobile communication station suffers from a deterioration in signal quality due to the presence of an obstacle. The provision of this handover function allows the user to move within the service area without communication being disrupted. For such handovers to go smoothly, mobile communication stations need to efficiently monitor the signals from peripheral base stations and properly detect the base station to be used for the call connect or handover. A technique for performing such a function is disclosed by Japanese Laid-Open Patent Application H01-303817, whereby the mobile communication station monitors the peripheral base stations by measuring the electric field strength (or "received signal strength indicator", hereinafter abbreviated to "RSSI") and, based on the monitoring, controls its transmitting/receiving means to obtain a control signal with a highest RSSI. By doing so, the mobile communication station can always perform communication using the base station with the most favorable conditions.

In general, RSSI fluctuates due to factors such as the presence of obstacles, so that it is conventional to take an average based on several measurements. In this way, variations in RSSI can be eliminated, with the accuracy of the measurement being dependent on the number of measurements taken of RSSI.

However, while the taking of several dozen measurements of RSSI enables the variations to be eliminated, should the mobile communication station move while the measurements are being taken, there is the risk that the mobile communication station will not select an appropriate base station for a call connect or handover. This risk becomes more pertinent as the mobile communication station moves at greater speed, so that the mobile communication station can end up using a base station at some distance from the present location. As a result, the mobile communication station may perform a call connect or handover using a base station which is unsuitable for the present location of the mobile communication station.

Since a large number of measurements of RSSI need to be taken, the measurement of RSSI cannot be instantaneously performed by the mobile communication station, meaning that a large amount of power is consumed by simply measuring the RSSI.

When selecting a base station for a call connect or handover, it is not possible to give priority to a base station which is controlled by the same base station control apparatus as the base station which is presently being used for communication. When a base station that is controlled by a different base station control apparatus is selected, it becomes necessary to connect the base station control apparatuses, with disconnections often occurring during communication between the two.

SUMMARY OF THE INVENTION

It is a first object of the present invention to reduce the time required by the selection of a base station. This is to say, the present invention aims to provide a mobile communication apparatus that can select a base station which is suitable for the present location of the mobile communication apparatus, even when there is a large number of base stations to be measured and the mobile communication apparatus is moving at high speed.

The second object of the present invention is to provide a mobile communication apparatus that can reduce the power consumed by searching for an appropriate base station for a present location of the mobile communication apparatus.

The third object of the present invention is to provide a mobile communication apparatus that can prevent disconnections that occur when base stations which are under the control of a same base station control apparatus as the presently used base station cannot be preferentially selected.

The aforementioned first and second objects can be achieved by a mobile communication apparatus, used in a mobile communication system, that measures signal quality of each radio channel assigned to each of a plurality of base stations and determines a base station to be used in communication based on a measuring result, the mobile communication apparatus comprising: a measured base station selecting unit for selecting one radio channel that is to be measured; a first signal quality measuring unit for measuring signal quality of the radio channel selected by the measured base station selecting unit; first judging unit for judging whether the signal quality measured by the first signal quality measuring unit meets a predetermined quality standard; first control unit for reactivating the first signal quality measuring unit when the measured signal quality is not judged to meet the predetermined quality standard and having the signal quality of the same radio channel measured again; and a second control unit for indicating to the measured base station selecting unit to select a different radio channel when the measured signal quality is judged to not meet the predetermined quality standard.

Since the first measuring unit only has base stations whose signal quality reaches a predetermined standard every unit time as the base stations to be measured, the time taken to monitor all of the base stations can be reduced. Accordingly, an appropriate base station can be detected even when the mobile communication apparatus is moving at high speed. This detection of a base station can be performed at high speed, even when there is a large number of base stations.

Since the time taken to monitor the periphery is reduced, a reduction in power consumption is achieved, making the periphery monitoring very efficient.

Here, the mobile communication apparatus may further comprise: a non-candidate storing unit for storing radio channels that are not regarded as selection candidates; a deleting unit for deleting a radio channel assigned to a base station from the candidate storing unit and writing the radio channel into the non-candidate storing unit, when the first judging unit has judged that signal quality of the radio channel meets the predetermined quality standard; a non-measured timer for measuring a duration, starting from a deletion of a radio channel of a base station from the candidate storing unit, for each deleted radio channel; and a restoring unit for restoring a radio channel written in the non-candidate storing unit from the non-candidate storing unit to the candidate storing unit to have signal quality thereafter measured for the radio channel, when the non-measured timer has measured a predetermined duration for the radio channel.

The stated construction deletes base stations with poor signal quality from the candidate storing unit, so that a large reduction can be made in the number of base stations whose signal quality is to be measured. By doing so, a large reduction can be made in the total time taken to measure the signal quality of all base stations, thereby improving the throughput of the base station measuring. Base stations which have been deleted from the candidate storing unit are restored to the candidate storing unit once a predetermined time has elapsed. By restoring such base stations to the candidate storing unit, base stations which were previously far from the mobile communication apparatus but which are now closer to the mobile communication apparatus due to the movement of the mobile communication apparatus can be restored as base stations whose signal quality is to be measured. By restoring base stations as base stations whose signal quality is to be measured depending on the present location of the mobile communication apparatus, flexible changes can be achieved in the base stations to be measured.

Here, in the mobile communication apparatus, the first signal quality measuring unit may include: a measuring unit for measuring at least one of a received signal strength indicator (hereinafter, "RSSI") of a selected radio channel and a quality indicator (hereinafter "QI") expressed as a center symbol of a received burst on the selected radio channel as the signal quality of the radio channel, where the first judging unit includes: a comparing unit for judging whether the signal quality of the selected radio channel meets the predetermined quality standard by comparing at least one of the RSSI and the QI measured by the measuring unit with a predetermined threshold.

With the stated construction, a base station to be used for a handover or call connect can evaluated using two kinds of parameter.

Here, the mobile communication apparatus may further comprise: a non-candidate storing unit for storing radio channels that are not regarded as selection candidates; a deleting unit for deleting a radio channel assigned to a base station from the candidate storing unit and writing the radio channel into the non-candidate storing unit, when the first judging unit has judged that signal quality of the radio channel meets the predetermined quality standard; a counting unit for counting a number of base stations presently stored in the candidate storing unit after a base station has been deleted by the deleting unit; a second judging unit for judging whether the number of base stations counted by the counting unit is below a predetermined number; and a restoring unit for restoring a radio channel written in the non-candidate storing unit from the non-candidate storing unit to the candidate storing unit to have signal quality thereafter measured for the radio channel, when the second judging unit judges that the number of base stations counted by the counting unit is below the predetermined number.

With the stated construction, the number of base stations stored in the candidate storing unit can be kept within a constant range by adding base stations, so that should the mobile communication apparatus be a location where there is poor signal reception, situations can be avoided where many base stations would be deleted from the candidate storing unit, making it impossible to select a base station to be measured or to be used in communication.

Here, in the mobile communication apparatus, the determining unit may include: a summing unit for summing all measurements of signal quality for a same radio channel; an averaging unit for calculating an average signal quality for each radio channel whose signal quality has been measured a number of times equal to the predetermined iteration number, using a summed value calculated by the summing unit and the predetermined iteration number; and a first determining unit for determining that a base station with a highest average calculated by the averaging unit should be used in communication.

With the stated construction, a base station with higher signal quality can be selected.

Here, the mobile communication apparatus may further comprise a difference calculating unit for calculating a difference for a plurality of signal quality measurements hitherto made for one base station by the first signal quality measuring unit, where the determining unit further includes: a comparing unit for comparing a highest average value calculated by the averaging unit with a predetermined standard level; an analyzing unit for referring, when the highest average value is below the predetermined standard level, to the difference calculated by the difference calculating unit for each base station and analyzing whether the signal quality of each base station is on an upward trend; and a second determining unit for determining the base station to be used, based on the upward trends analyzed by the analyzing unit.

With the stated construction, a base station with a highest increase in signal quality is selected when there is no base station with a signal quality that is as high as the predetermined standard. Accordingly, a base station located in the general direction in which the mobile communication apparatus is presently moving can be preferentially selected. By doing so, the base station which will have a highest signal quality after a given time can be predicted and used to establish a radio link.

The second object of the present invention can be achieved by the mobile communication apparatus further comprising: a second signal quality measuring unit for measuring signal quality of a radio channel presently used for transmitting and receiving; a comparing unit for comparing the signal quality measured by the second signal quality measuring unit with a measurement termination threshold; a prohibiting unit for prohibiting a measurement by the first signal quality measuring unit of the signal quality of radio channels of other base stations when the comparing unit finds that the signal quality measured by the second signal quality measuring unit is above the measurement termination threshold; and a prohibition removing unit for having the measurement of the signal quality of the radio channels of other base stations recommenced by the first signal quality measuring unit if, after a prohibition of measurement, the signal quality measured by the second signal quality measuring unit falls below the measurement termination threshold.

With the stated construction, the measurement of signal quality of other base stations is not performed when the mobile communication apparatus is stationary or moving slowly so that the signal quality on the presently used channel is high. The measurement of other base stations is only commenced when the signal quality of the present base station deteriorates due to the mobile communication apparatus being located at a position with poor signal reception. By limiting the situations where measurement of other base stations is performed, unnecessary measurements of signal quality can be avoided, reducing the time taken out of battery saving time to monitor the periphery. By doing so, a significant reduction in power consumption can be achieved.

The third object of the present invention can be achieved by the mobile communication apparatus, where each base station provides information as to a base station control apparatus that manages the base station in a communication service, and where at least one mobile communication apparatus in the mobile communication system further comprises: a base station control apparatus storing unit for storing information indicating a base station control apparatus which controls base stations for a communication service used by the mobile communication apparatus; a first detecting unit for detecting and extracting base stations, out of the base stations whose signal quality is repeatedly measured a number of times equal to the predetermined iteration number by the first signal quality measuring unit, that are controlled by the base station control apparatus indicated by the information stored in the base station control apparatus storing unit; a second detecting unit for detecting and extracting base stations, out of the base stations whose signal quality is repeatedly measured a number of times equal to the predetermined iteration number by the first signal quality measuring unit, that are not controlled by the base station control apparatus indicated by the information stored in the base station control apparatus storing unit; a first determining unit for determining, when the first detecting unit has detected at least one base station that is controlled by the base station control apparatus indicated by the information stored in the base station control apparatus storing unit, a base station with a highest signal quality out of the base stations extracted by the first detecting unit as the base station to be used in communication; and a second determining unit for determining, when the first detecting unit has not detected a base station that is controlled by the base station control apparatus indicated by the information stored in the base station control apparatus storing unit but the second detecting unit has detected at least one base station that is controlled by another base station control apparatus of the communication service, a base station with a highest signal quality out of the base stations extracted by the second detecting unit as the base station to be used in communication.

With the stated construction, base stations controlled by the base station control apparatus that controls the present base station can be preferentially selected, so that a handover can be performed quickly and properly. By avoiding base stations that are controlled by other base station control apparatuses, interruptions in communication that occur during handovers can be avoided.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 15 shows the stored content of the measured base station table 101;

FIG. 16 shows the stored content of the peripheral base station table 102;

FIG. 19 shows the stored content of the measured base station table 202; and

FIG. 20 shows the stored content of the peripheral base station table 102 after updating by the peripheral base station table updating unit 113.

DESCRIPTION OF THE PREFERRED EMBODIMENTS

First Embodiment

Figure 1:
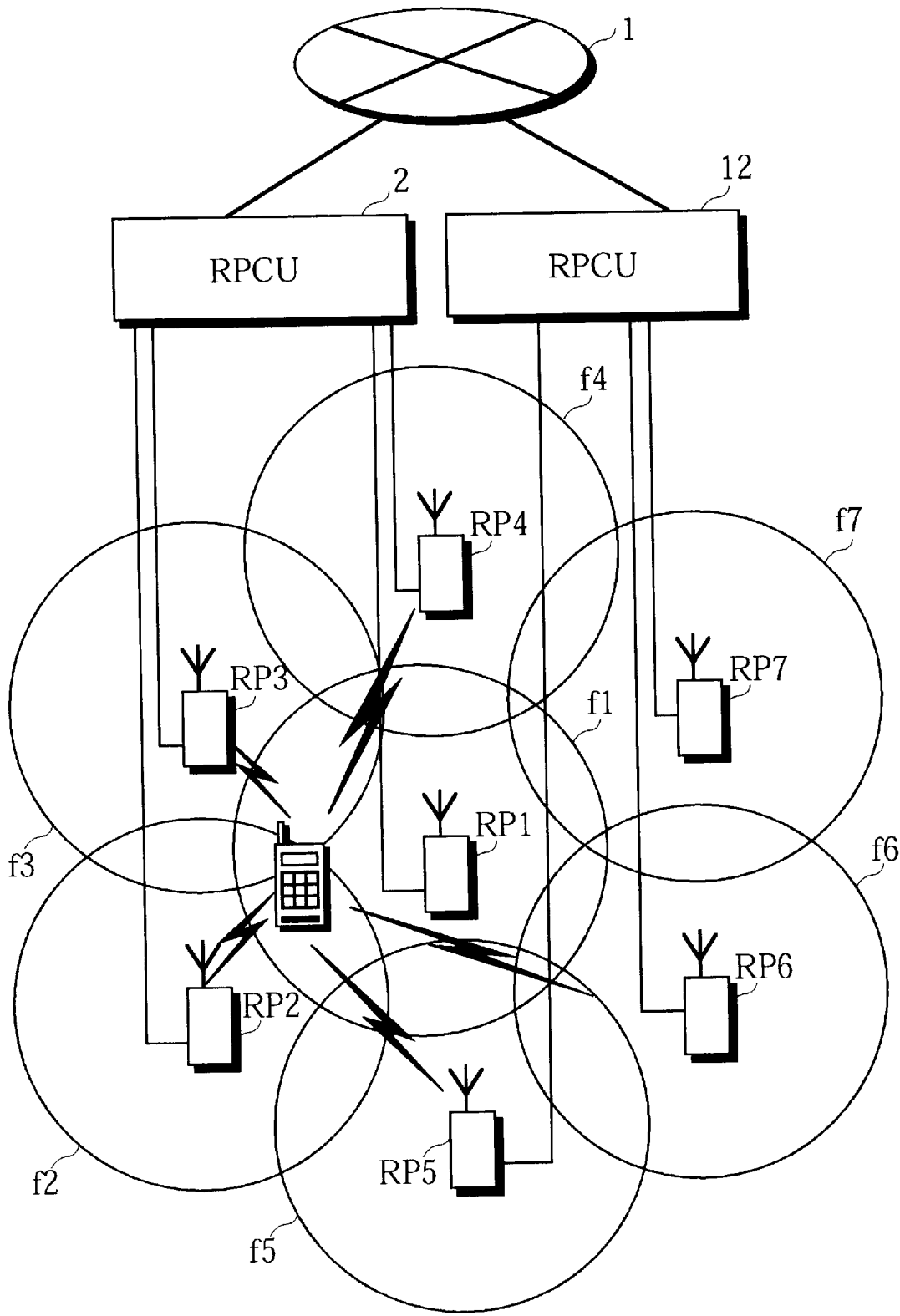
FIG. 1 shows a representation of an example construction of a system which uses the mobile communication apparatus of the present invention.

FIG. 1 shows the construction of the radio communication system of the first embodiment of the present invention. In FIG. 1, the base station control apparatuses 2 and 12 (each represented as RPCU (Radio Port Control Unit) in this drawing) are connected to the communication network 1. A plurality of base stations (represented by base stations RP1–RP4 in FIG. 1) are connected to and controlled by the base station control apparatus 2 and have the radio zones shown as f1–f4. Similarly, a plurality of base stations (represented by base stations RP5–RP7 in FIG. 1) are connected to and controlled by the base station control apparatus 12 and have the radio zones shown as f5–f7. A mobile communication apparatus is positioned in any of these radio zones.

The communication network 1 can be composed of a communications network such as a telephone network, an ISDN (Integrated Digital Services Network), or a radio network. Base stations RP1–RP7 (where "RP" stands for "radio port" correspond to the radio zones f1 to f7 which are each assigned the different frequencies f1 MHz, f2 MHz, f3 MHz, f4 MHz, f5 MHz, f6 MHz, and f7 MHz. The mobile communication apparatus, shown in the form of a portable telephone, is located in the radio zone f1 and is in radio contact with base station RP1. It should be noted here that in the present embodiment, communication between mobile communication apparatuses in the radio zones f1 to f7 and base stations RP1 to RP7 can be performed digitally using TDMA.

When the mobile communication apparatus moves away from radio zone f1 of base station RP1 and approaches the radio zone f4 of base station RP4, the mobile communication apparatus will detect that the signal quality (described in detail later in this specification) of base station RP4 is higher than the signal quality of base station RP1 to which the mobile communication apparatus is presently connected. At such point, the mobile communication apparatus will switch its radio connection from base station RP1 to base station RP4. It should be noted here that while only seven base stations are illustrated in FIG. 1, this should not be construed as a limitation for this embodiment.

Figure 2:
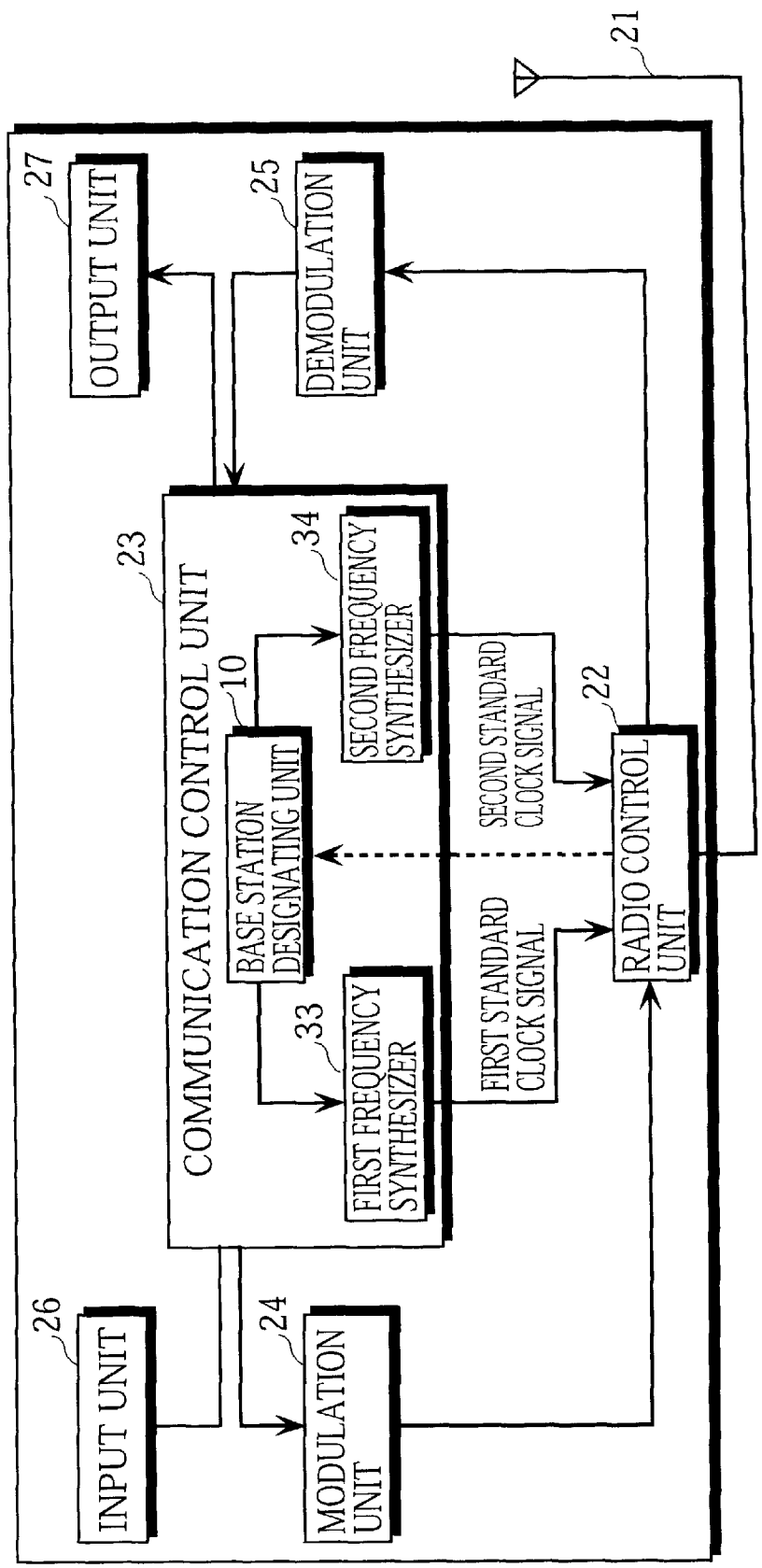
FIG. 2 is a block diagram showing an example construction of the mobile communication apparatus of the present invention.

FIG. 2 is a block diagram showing the construction of the mobile communication apparatus shown in FIG. 1. As shown in FIG. 2, the mobile communication apparatus is composed of an antenna 21, a radio control unit 22, a communication control unit 23, a modulation unit 24, a demodulation unit 25, an input unit 26, and an output unit 27.

The modulation unit 24 modulates the communication data outputted by the communication control unit 23 according to a predetermined method (such as □/4 shift DQPSK modulation), and outputs the result to the radio control unit 22.

The demodulation unit 25 demodulates the signal received by the radio control unit 22 and transfers the result to the communication control unit 23.

The input unit 26 can be composed of a keyboard and a microphone. Data, such as a dialled number inputted by the user typing keys on the keyboard, is inputted into the communication control unit 23, while audio inputted via the microphone is also inputted into the communication control unit 23.

The output unit 27 can be composed of a magnetic disc device, a display device, and a speaker device. The output unit 27 stores the received data outputted by the communication control unit 23 in the magnetic disc device and has it displayed by the display device. At the same time, if the received data outputted by the communication control unit 23 includes audio, this audio is outputted using the speaker device.

The communication control unit 23 includes a CPU, a ROM, and a RAM, and controls the communication state of the mobile communication apparatus. When data such as a dialled number is inputted into the communication control unit 23 from the input unit 26, the communication control unit 23 generates a communication control message, such as a call setting message, based on the input data and outputs it to the modulation unit 24. When audio is inputted into the communication control unit 23 via the input unit 26, the communication control unit 23 converts the inputted audio into digital data and outputs it to the modulation unit 24.

When the demodulation result of the demodulation unit 25 is inputted, the communication control unit 23 performs control in accordance with the communication control message included in the demodulation result, such as for a call connect or call disconnect. The communication control unit 23 also outputs the received data obtained as the demodulation result to the output unit 27.

The radio control unit 22 performs a time division multiplexing process for time slots on a specified frequency in accordance with a standard clock signal obtained from the communication control unit 23 and a channel switching indication. This time division multiplexing process results in a plurality of time slots being formed on a radio carrier wave of a specified frequency. These time slots on a radio carrier wave are used as communication channels, so that the modulated data provided by the modulation unit 24 can be transmitted by the antenna 21. At the same time, the received data is obtained from the high frequency signals that are picked up by the antenna 21.

It should be noted here the communication control unit 23 is provided with a first frequency synthesizer 33, a second frequency synthesizer 34, and a base station designating unit 10 to switch the communication channel used by the radio control unit 22 as part of the control of the communication state. The first frequency synthesizer 33 and the second frequency synthesizer 34 provide the radio control unit 22 with two types of clock signal called a first and second standard clock signal, while the base station designating unit 10 provides the radio control unit 22 with a channel switching indication to specify a monitoring of the peripheral base stations or a base station to be used when performing a call connect or handover. The first standard clock signal is a clock signal for establishing a radio link and communicating with the base station. Since communication with a base station is performed using a time division multiplexing method, the first standard clock signal generated by the first frequency synthesizer 33 is only provided to the radio control unit 22 during the period when the up and down time slots for the present mobile communication apparatus are being transmitted.

The second standard clock signal is used for performing the base station designation processing, and is provided to investigate the signal quality of the base stations in the periphery of the mobile communication apparatus, aside from the base station currently being used for radio communication. Since communication with a base station is performed using a time division multiplexing method, the second standard clock signal generated by the second frequency synthesizer 34 is only provided to the radio control unit 22 during the period when the up and down time slots for the present mobile communication apparatus are not being transmitted.

Figure 3:
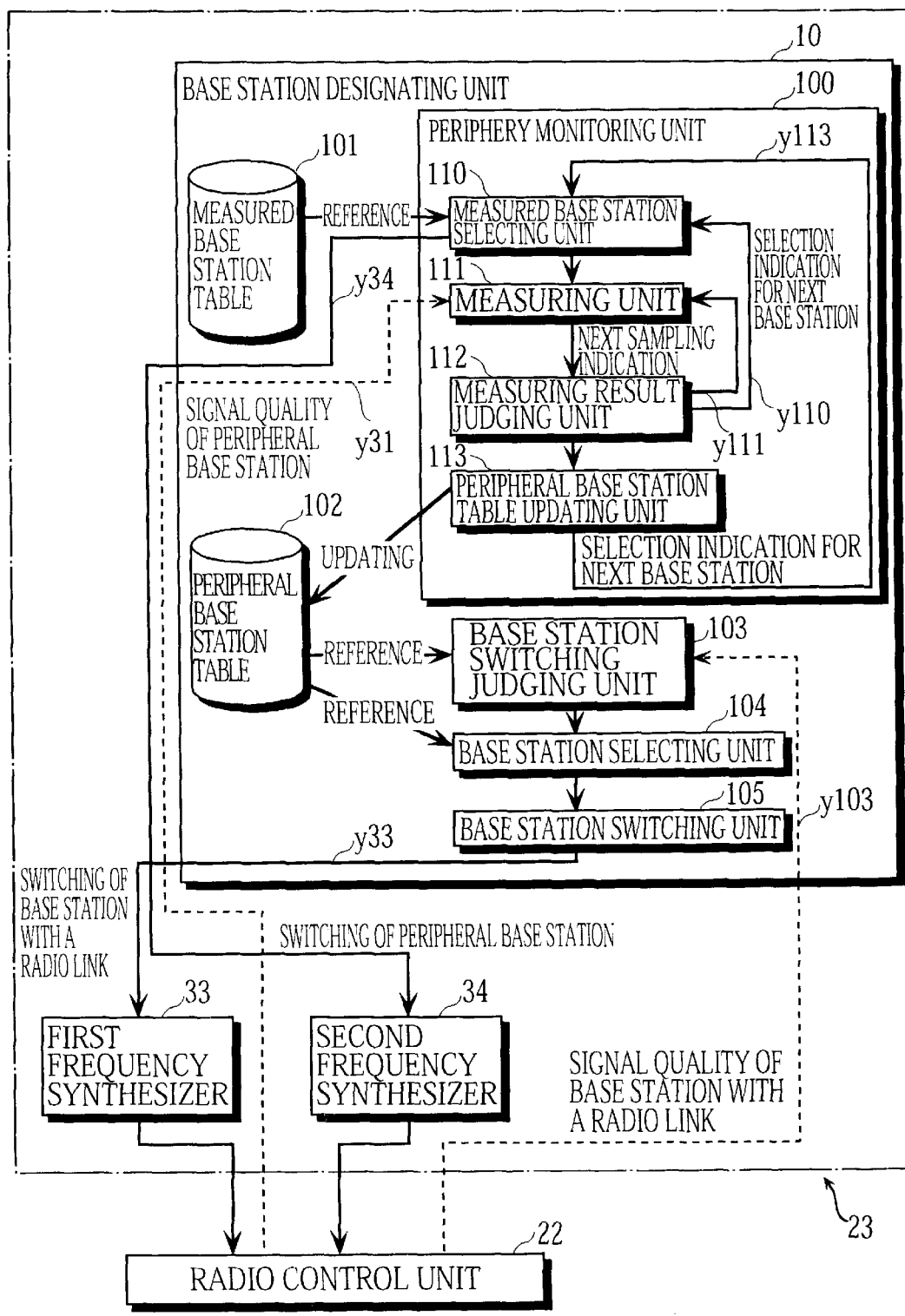
FIG. 3 is a block diagram showing the construction of the base station designating unit 10 in the first embodiment of the present invention.

FIG. 3 is a block diagram showing the construction of the base station designating unit 10 in the first embodiment of the present invention. This base station designating unit 10 is composed of a periphery monitoring unit 100, a measured base station table 101, a peripheral base station table 102, a base station switching judging unit 103, a base station selecting unit 104, and a base station switching unit 105.

The periphery monitoring unit 100 is composed of a measured base station selecting unit 110, a measuring unit 111, a measuring result judging unit 112, and a peripheral base station table updating unit 113.

The measured base station selecting unit 110 refers to the measured base station table 101 and selects the next base station whose signal quality is to be measured. As shown by arrow y34 in FIG. 3, the measured base station selecting unit 110 gives the second frequency synthesizer 34 an indication for radio channel switching so that the radio channel of the selected base station is received.

The measured base station table 101 stores the frequency bands assigned to each of the base stations in the communication service in the form of a list. An example of such a list of frequency bands is shown in FIG. 15, and is a list that includes fifty bands (given as f1, f2, f3, f4, . . . f48, f49, f50 in FIG. 20) used by fifty base stations (RP1, RP2, RP3, . . . RP48, RP49, RP50).

The peripheral base station table 102 stores information for a selection of base stations that have been extracted out of the stored content of the measured base station table 101. An example of the stored content of the peripheral base station table 102 is shown in FIG. 16. As shown in the figure, the peripheral base station table 102 stores each frequency band (given as f1, f2, f3 . . . in the figure) of a base station related to the RSSI (given as R1, R2, R3 . . . in the figure) band and the QI (given as Q1, Q2, Q3 . . . in the figure) of each frequency band.

When an indication for a switching of radio channel is sent to the second frequency synthesizer 34 by the measured base station selecting unit 110, the measuring unit 111 has the radio control unit 22 measure the signal quality and informs the measuring result judging unit 112 of the measuring result. In the present embodiment, signal quality is a general expression used for the RSSI and QI of a signal received from a base station. The measurement of the former, RSSI, is performed by repeatedly measuring RSSI and then taking an average.

The latter, QI, is an estimated value of an eye-opening for a received burst, so that this value varies with the interference ratio for the pulse noise in a received burst, which is to say the extent to which pulse noise interferes with the received burst. The value QI is measured by measuring an eye-opening of at least 50% about a center symbol which is included in the received burst. This means that there will be some degree of fluctuation in the measured value due to the data in the received burst itself, so that in the same way as RSSI, QI needs to be found by measuring the eye-opening many times and taking an average to eliminate the unwanted fluctuations in the measured value.

In the explanation given below, RSSI and QI are both set as being measured thirty times, with the averages of the respective sets of thirty measurements being outputted as the measured results for each frequency band. It should be noted here that it is also possible for other calculation methods aside from averages to be used for the calculating the measured values.

The measuring result judging unit 112 calculates the respective average values for RSSI and the QI measured by the measuring unit 111, compares the average values with a predetermined threshold value and performs a judgement as to whether the measurement of the signal quality of the present base station should be continued, or whether a switch should be performed to a measurement of the signal quality of a next base station. If the average value is greater than the threshold value, the measuring result judging unit 112 gives an indication to the measuring unit 111 to continue measuring the signal quality of the present base station, as shown by arrow y111 in FIG. 3. When the signal is equal to or below the threshold value, the measuring result judging unit 112 gives the measured base station selecting unit 110 an indication to switch to the radio channel of a next base station, as shown by arrow y110 in FIG. 3, with the measured base station selecting unit 110 then instructing the measuring unit 111 to measure RSSI and the QI of the radio channel of the base station selected by the measured base station selecting unit 110.

Figure 17A:
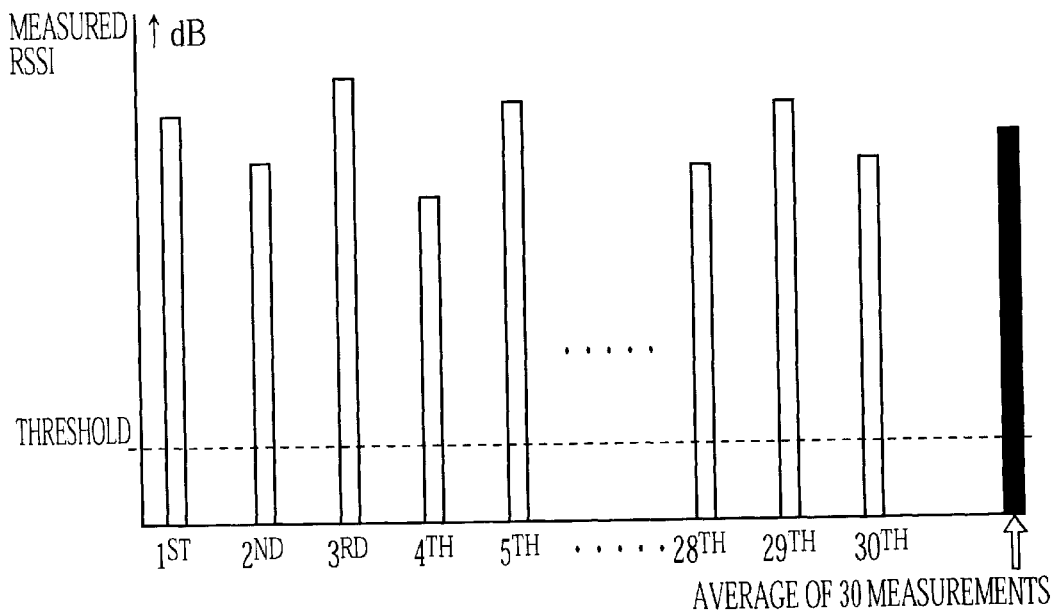
FIG. 17A is a graph showing the execution of thirty measurements of RSSI.
Figure 17B:
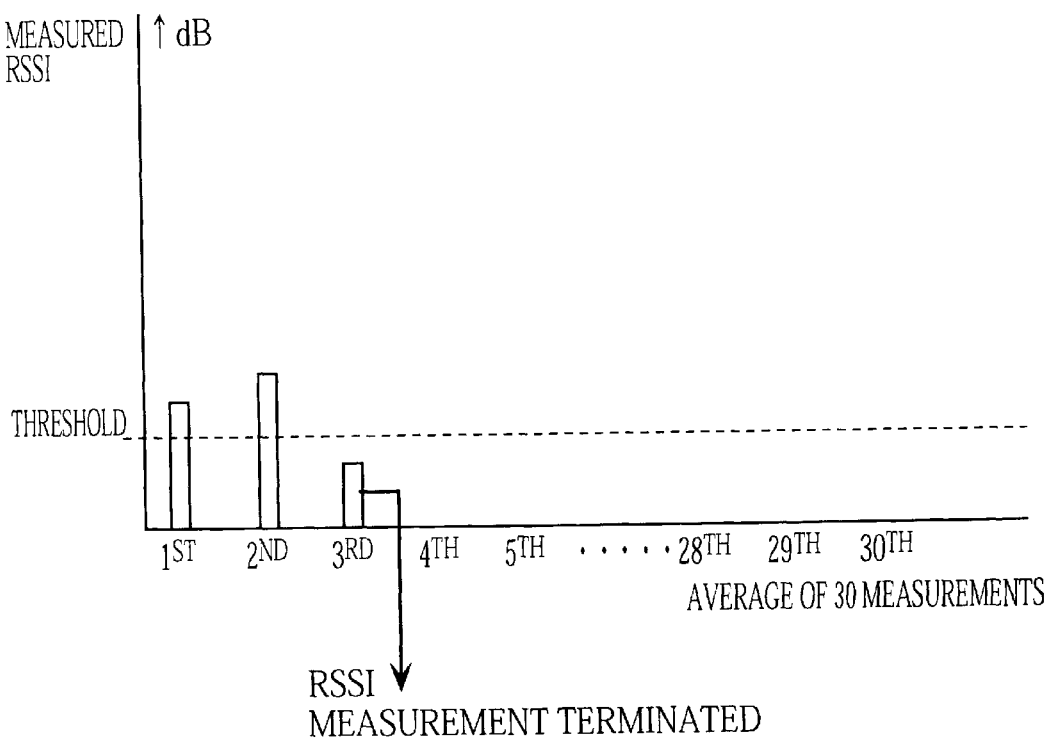
FIG. 17B is a graph showing the case where measurement of RSSI is only halted after only three measurements.

FIGS. 17A and 17B are graphs showing the processing content of the measuring result judging unit 112. FIG. 17A shows a case where the signal quality measured by the measuring unit 111 always exceeds the threshold value for a predetermined number of samples (thirty in the example shown in FIG. 17A). As a result, measurement of the signal quality on the radio channel assigned to the present base station is continued and the average value of signal quality (shown as the shaded bar in FIG. 17A) is recalculated once the predetermined number of consecutive measurements have been taken. After the average has been calculated, the average value is reported to the peripheral base station table updating unit 113 as the measuring judgement result. When the signal quality is equal to or below the threshold value, the peripheral base station table updating unit 113 is notified of a measuring judgement result which states that the measurement has been terminated due to low signal quality.

The following is an explanation of the operation of the invention defined in claim 3 when a signal quality which is equal to or lower than the threshold value is obtained when performing the predetermined number of consecutive measurements, an example of which is shown in FIG. 17B. When a sample value for signal quality that is equal to or lower than the threshold value is obtained, the measuring result judging unit 112 has the measuring unit 111 immediately terminate the measurement of signal quality on the present channel and informs the peripheral base station table updating unit 113 that the measurement of signal quality has been terminated for the present radio channel due to low signal quality. After this, the measuring result judging unit 112 has the measurement commenced for the next frequency band.

Figure 18:
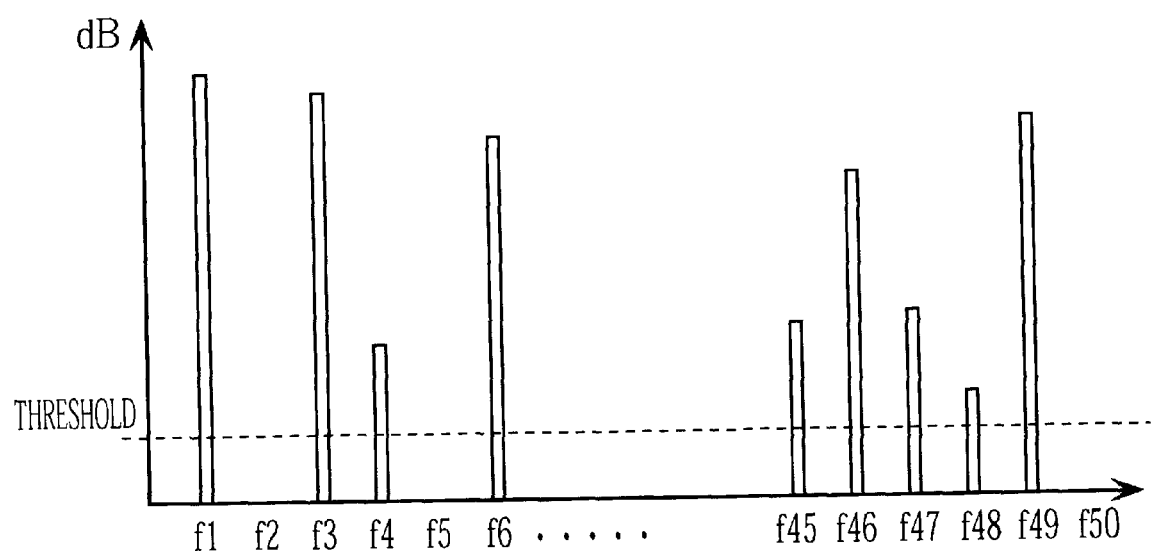
FIG. 18 shows the signal quality of each base station stored in the measured base station table 101.

By measuring signal quality based on a comparison with a threshold value, only average values for frequency bands f1, f3, f4, f6 . . . f46, f49 which exceed the threshold value are given in the graph of average values for RSSI shown in FIG. 18. In this case, thirty measurements of received signal quality are performed for the frequency bands f1, f3, f4, f6, . . . and the average values shown in FIG. 18 are calculated.

On the other hand, signal quality values which are equal to or below the threshold value are obtained for the frequency bands f2, f5, f7, f8, . . . f50, so that the measurements of signal quality for these frequency bands are terminated before thirty measurements have been completed and no average values are calculated.

The peripheral base station table updating unit 113 writes base stations with high received signal quality, out of the base stations given in the measured base station table 101, into the peripheral base station table 102, based on the measuring judgement result reported by the measuring result judging unit 112 and the information stored in the peripheral base station table 102. For the example shown in FIG. 16, the peripheral base station table updating unit 113 writes the base stations, the RSSI, and the QI for the frequency bands f1, f3, f6 . . . that were measured the full thirty times into the peripheral base station table 102. When the writing operation is complete, the peripheral base station table updating unit 113 sends an indication to the measured base station selecting unit 110, as shown by the arrow y113 in FIG. 3, to have it select the next base station which is to have its RSSI and QI measured.

The base station switching judging unit 103 monitors the signal quality of the radio control unit 22 for the period that the first standard clock signal generated by the first frequency synthesizer 33 is provided, and judges whether there has been any deterioration in radio quality for the base station to which a radio link is presently established. When such deterioration occurs for the present radio link, the base station switching judging unit 103 decides that switching of base station should be performed and requests the base station selecting unit 104 to select a base station to which a call connect or handover is to be performed. Also, when a radio channel that is superior to the present channel has been detected, the base station switching judging unit 103 requests the base station selecting unit 104 to select a base station to which a call connect or handover is to be performed.

On being requested by the base station switching judging unit 103 to select a base station, the base station selecting unit 104 refers to the information stored in the peripheral base station table 102, selects the base station with the highest measured signal quality as the base station to which a call connect or handover is to be performed, and informs the base station switching unit 105 of its selection.

On receiving the selection of the base station to which a call connection or handover is to be performed from the base station selecting unit 104, the base station switching unit 105 performs the processing via the signal line y33 in FIG. 3 to have the first frequency synthesizer 33 switch its generated frequency so that the indicated base station is used as the base station to which a call connect or handover is to be performed.

Figure 11:
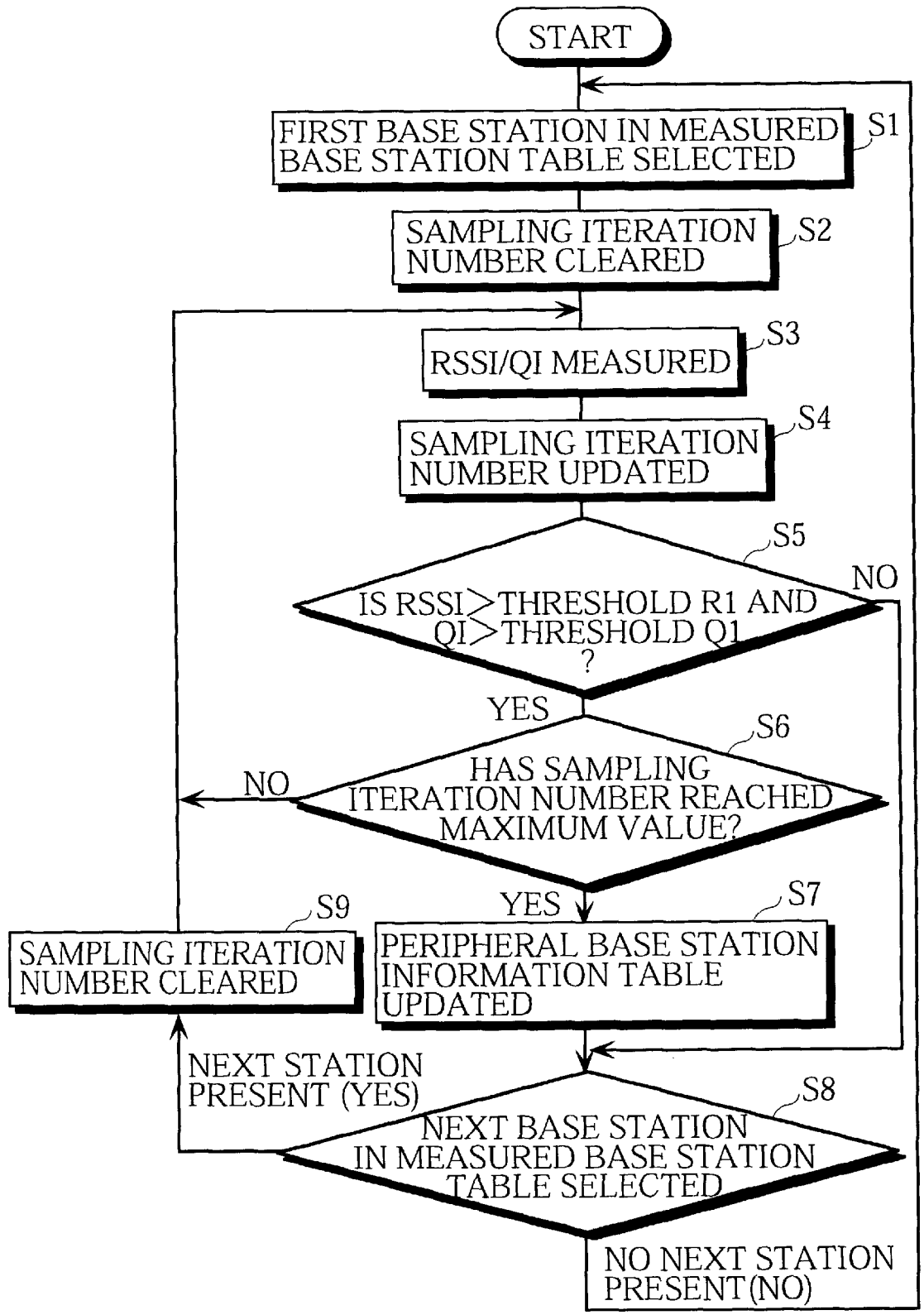
FIG. 11 is a flowchart showing a specific procedure for a control operation by the periphery monitoring unit 100 shown in FIG. 3.

FIG. 11 is a flowchart showing the control procedure for the mobile communication apparatus of the first embodiment of the present invention. The operation of the base station designating unit 10 is described below with reference to this flowchart. In this example, the operating state of the base station designating unit 10 is as shown in FIG. 1, so that the mobile communication apparatus is located within the radio zone f1 of base station RP1 with which it is in radio communication. In such a case, the peripheral radio stations are base stations RP4 to RP7. Accordingly base station RP4, base station RP5, base station RP6, and base station RP7 are stored in that order in the measured base station table 101.

First, the content of the measured base station table 101 is referred to and base station RP4 stored at the top of the measured base station table 101 is selected as the base station whose signal quality is to be measured (Step S1), with the sampling iteration number T being cleared (Step S2).

The RSSI and QI of the selected base station RP4 are then measured as its signal quality (Step S3), and "1" is added to the sampling iteration number T (Step S4). The RSSI and QI measured in this way are then compared with the respective threshold values R1 and Q1 (Step S5). When both the RSSI and the QI for base station RP4 exceed the threshold values, the result "Yes" is given in Step S5, and the processing advances to Step S6 where the sampling iteration number is compared with the maximum number of measurements to see if it has reached the maximum number. Since the present iteration is the first measurement for base station RP4, the result "No" is given in Step S6 and the processing in Steps S3 to S5 is repeated.

When the signal characteristics for the signal from base station RP4 are favorable, no value of RSSI or QI which is equal to or below the respective threshold value will be measured, so that thirty iterations (the maximum number) of the processing in Steps S3 to S6 will be performed.

When the number of measurements becomes equal to the maximum number of measurements ("Yes" in Step S6), the average values for the measured RSSI and QI are calculated and the peripheral base station table updating unit 113 writes an identifier for base station RP4, its frequency band, and the RSSI and QI into the peripheral base station table 102 as the information for base station RP4 (Step S7). After this write operation, the measuring result judging unit 112 instructs the measured base station selecting unit 110 to select a next base station. The measured base station selecting unit 110 refers to the measured base station table 101 and judges whether there is a next base station (Step S8). In the present example, a next base station, base station RP5, is present ("Yes" in Step S8), so that this is selected, the sampling iteration number T is cleared (Step S9), and the processing returns to Step S3.

The RSSI and QI of the next selected base station RP5 are then measured as its signal quality (Step S3), and "1" is added to the sampling iteration number T (Step S4). The RSSI and QI measured in this way for the selected base station are then compared with the respective threshold values R1 and Q1 (Step S5). If both values for base station RP5 exceed the respective thresholds, then the result "Yes" is given in Step S5 and in Step S6, the present sampling iteration number T is compared with the maximum number of measurements to see if it has reached the maximum number. Since the present iteration is the first measurement for base station RP5, the result "No" is given in Step S6 and the processing in Steps S3 to S5 is repeated.

In the present case, however, an obstacle is present between the mobile communication apparatus and base station RP5, so that the signal characteristics become unfavorable and during the third sampling iteration, one of the RSSI and the QI is judged in Step S5 as being below its respective threshold. When this happens, Steps S6 and S7 are skipped and the processing advances to Step S8, where the measuring result judging unit 112 instructs the measured base station selecting unit 110 to select a next base station to be measured. In Step S8, the measured base station selecting unit 110 judges whether there is another base station present in the measured base station table 101, and when this is the case, the sampling iteration number T is cleared and the processing in Steps S3 to S8 is performed for the measurement of the next base station.

By means of the present embodiment described above, the measurement of signal quality is only repeated for channels where the signal quality is always above the threshold value, with the measurement of a channel being terminated as soon as a value equal to or below the threshold value is obtained and the measurement then being performed for a next base station. As a result, futile measurement of base stations with poor signal quality is not continued. As a result, a large reduction in the time required to measure all of the peripheral base station can be made. In the present embodiment, when the present location of a mobile communication apparatus changes, the signal quality for base stations which are located far from the mobile communication apparatus and which have large obstacles obstructing communication with the mobile communication apparatus will be expressed by values that are equal to or below the threshold values, so that the measurement of the signal quality of such stations will be terminated midway. As a result, the mobile communication apparatus is able to focus on only suitable base stations for the base stations to be measured.

Second Embodiment

The second embodiment of the present invention reduces the time required for measuring the signal quality of all base stations by removing base stations with low signal quality from the measurement.

Figure 4:
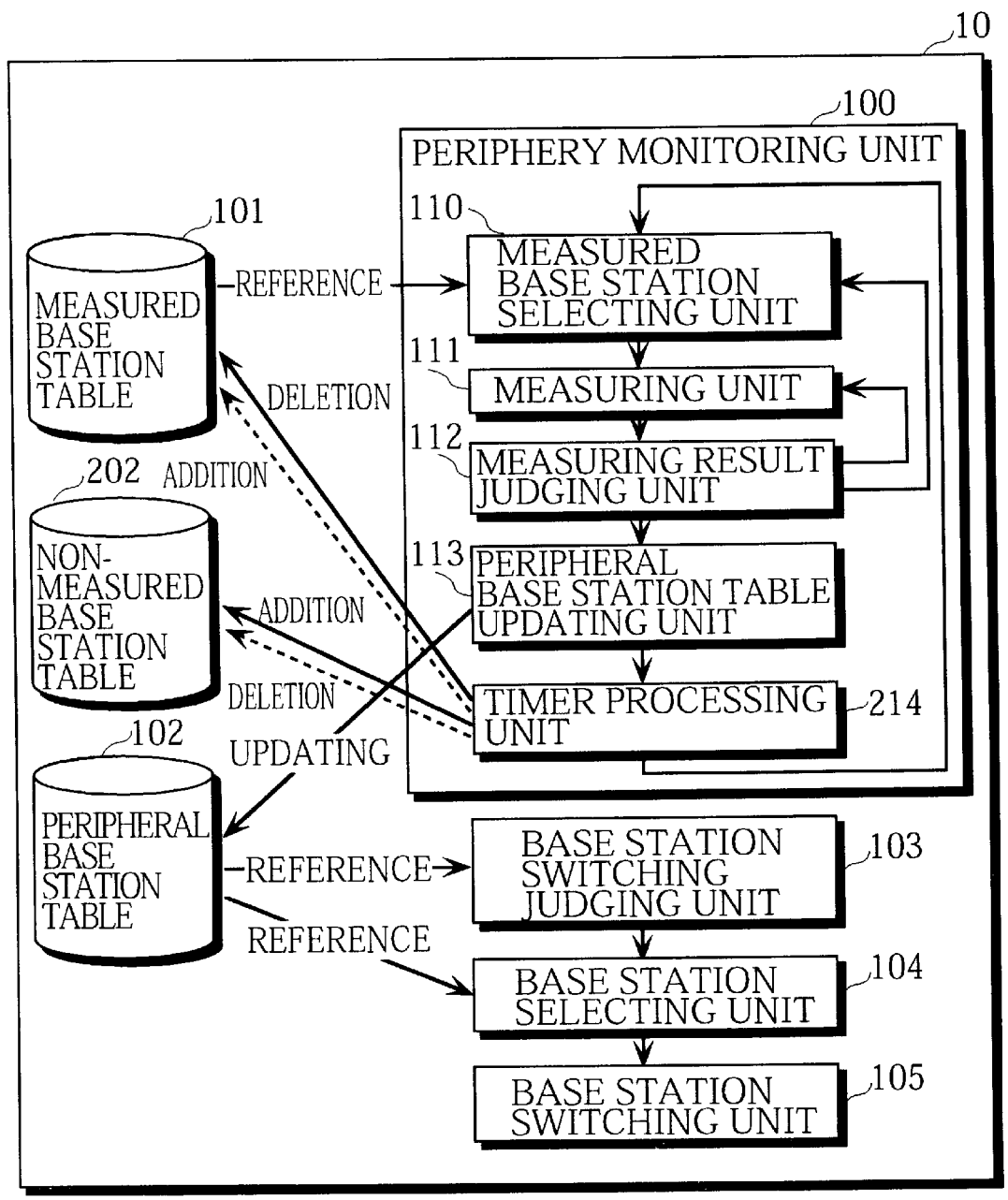
FIG. 4 is a block diagram showing the construction of the base station designating unit 10 in the second embodiment of the present invention.

FIG. 4 is a block diagram showing the construction of the mobile communication apparatus of the second embodiment. As shown in the figure, the mobile communication apparatus of the present embodiment is composed of a periphery monitoring unit 100, a measured base station table 101, a peripheral base station table 102, a base station switching judging unit 103, a base station selecting unit 104, and an base station switching unit 105 in the same way as in the first embodiment. In addition to these components, the mobile communication apparatus of the second embodiment also includes a non-measured base station table 202. The periphery monitoring unit 100 of the second embodiment includes a measured base station selecting unit 110, a measuring unit 111, a measuring result judging unit 112, and a peripheral base station table updating unit 113 in the same way as in the first embodiment, but also includes a timer processing unit 214 as an original component.

The following is a description of the additional components in the second embodiment of the present invention.

As shown in FIG. 19, the non-measured base station table 202 stores combinations of frequency bands which are not being measured and the elapsed times starting from the time at which the corresponding base station was set as a non-measured base station.

The timer processing unit 214 includes a non-measured timer, and, in addition to moving base stations whose measurement is terminated by the measuring result judging unit 112 from the measured base station table 101 to the non-measured base station table 202, restores base stations for which the non-measured timer has measured a time-out from the non-measured base station table 202 to the measured base station table 101. The non-measured timer referred to here measures the time for which measurement is terminated for each base station that has been removed from the measured base station table 101 and is used to measure the non-measured elapsed times.

The transfer of a base station from the measured base station table 101 to the non-measured base station table 202 is performed when the measuring result judging unit 112 reports that measurement has been terminated due to low signal quality, so that the base stations for which measurement is terminated are deleted from the measured base station table 101. At the same time, these base stations are added to the non-measured base station table 202 to complete the transfer from the measured base station table 101 to the non-measured base station table 202. If the base stations with signal quality values equal to or below the threshold values are deleted from the measured base station table 101, a large reduction can be achieved in the number of base stations to be measured, so that the measurement processing by the measured base station selecting unit 110 and the measuring unit 111 can be performed in a shorter time during the following executions.

When a base station is added to the non-measured base station table 202, the non-measured timer is started for the base station so that all base stations in the non-measured base station table 202 can be controlled in terms of how long they have been removed from the measurement. However, once a predetermined time has elapsed from the removal of the base station from measurement, the base station is restored as a base station that should be measured.

With the present embodiment described above, base stations with low signal quality are removed from the measured base station table 101, so that a large reduction is achieved in the number of base stations for which measurement needs to be performed. By doing so, a large reduction can be made in the time required to measure all of the base stations. The base stations that have been deleted from the measured base station table 101 are written into the non-measured base station table 202 and then restored to the measured base station table 101 after a predetermined time has elapsed. By restoring base stations a predetermined time after they were removed from the measured base station table 101, base stations which were previously located far from the mobile communication apparatus (and so unsuitable for use) but which are now in the periphery can restored after a predetermined time as base stations which are measured. By restoring base stations whose measured values were previously equal to or below the threshold value in accordance with the present location of the mobile communication apparatus, the base stations that are to subjected to measurement can be flexibly changed.

Third Embodiment

The third embodiment of the present invention is an improvement on the second embodiment, and likewise achieves a reduction in the time required to measure the signal quality of base stations.

Figure 5:
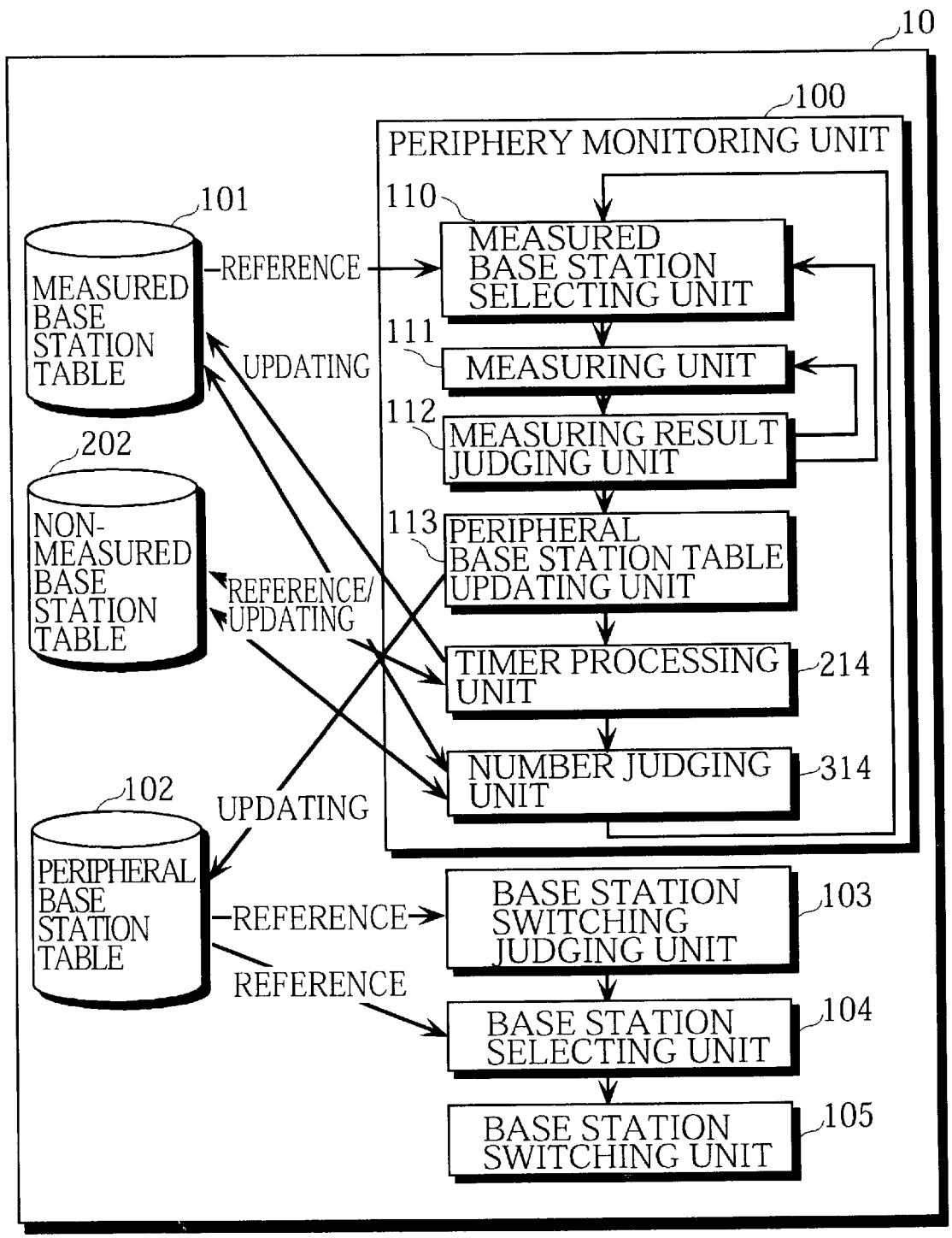
FIG. 5 is a block diagram showing the construction of the base station designating unit 10 in the third embodiment of the present invention.

FIG. 5 is a block diagram showing the construction of the mobile communication apparatus of the third embodiment of the present invention. As shown in FIG. 5, the periphery monitoring unit 100 of the third embodiment includes the measured base station selecting unit 110, the measuring unit 111, the measuring result judging unit 112, the peripheral base station table updating unit 113, and the timer processing unit 214 of the second embodiment, as well as further including a number judging unit 314 as a new component.

The number judging unit 314 obtains the number of base stations stored in the measured base station table 101 and compares the obtained number of base stations with a predetermined lower limit. When the obtained number of base stations is below the lower limit, the number judging unit 314 refers to the non-measured base station table 202 and obtains the base station in the non-measured base station table 202 with the shortest remaining time to be measured by the non-measured timer. The non-measured timer for the base station in question is then stopped, and the base station is deleted from the non-measured base station table 202 and added to the measured base station table 101. The timer processing unit 214 then obtains the number of base stations stored in the measured base station table 101, and repeats the addition of base stations to the measured base station table 101 from the non-measured base station table 202 until the number of base stations in the measured base station table 101 reaches a predetermined upper limit.

Figure 12:
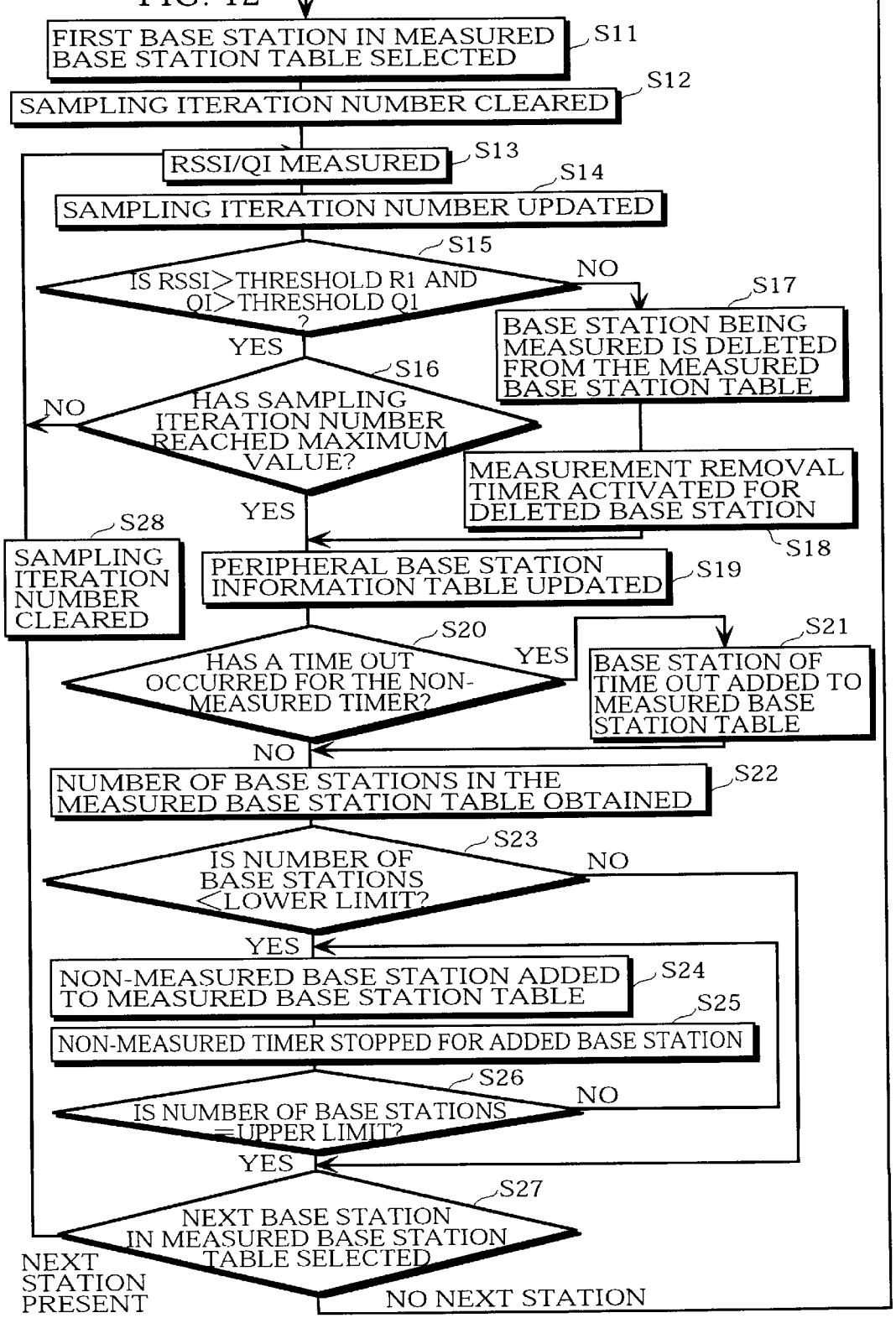
FIG. 12 is a flowchart showing a specific procedure for a control operation by the periphery monitoring unit 100 shown in FIG. 5.

FIG. 12 is a flowchart showing the control procedure for the mobile communication apparatus of the third apparatus of the present invention. The operation of the periphery monitoring unit 100 of the third embodiment shown in FIG. 5 is described below with reference to this flowchart. In this example, the operating state of the periphery monitoring unit 100 of the third embodiment is as shown in FIG. 1, so that the mobile communication apparatus is located within the radio zone f1 of base station RP1 with which it is in radio communication. In such a case, the peripheral radio stations are base stations RP4 to RP7.

First, the measured base station selecting unit 110 refers to the measured base station table 101 and selects base station RP4 stored at the top of the measured base station table 101 as the base station whose signal quality is to be measured (Step S11). Next, the sampling iteration number T is cleared (Step S12). In the present state, base stations RP4 to RP9 are stored in that order in the measured base station table 101 as the list of base stations to be measured.

The measuring unit 111 then measures the RSSI and QI of the selected base station RP4 as its signal quality (Step S13), and the measured base station selecting unit 110 adds "1" to the sampling iteration number T (Step S14).

The RSSI and QI measured in this way are then compared with the respective threshold values R1 and Q1 (Step S15). When both the RSSI and the QI for base station RP4 exceed the threshold values, the result "Yes" is given in Step S15, and the processing advances to Step S16 where the sampling iteration number is compared with the maximum number of measurements to see if it has reached the maximum number. The processing in Steps S13 to S16 is then repeated until the sampling iteration number T becomes equal to the maximum number.

When the sampling iteration number T becomes equal to the maximum number ("Yes" in Step S16), the average values for the measured RSSI and QI are calculated and are written into the peripheral base station table 102 as the information for base station RP4 (Step S19). Here, the information for the base stations in the peripheral base station table 102 is arranged in descending order of signal quality.

When at least one of the RSSI and the QI is equal to or below its respective threshold ("No" in Step S15), the signal quality of base station RP4 currently being measured is judged to have deteriorated, so that base station RP4 is added to the non-measured base station table 202 (Step S17), the non-measured timer is activated (Step S18), and base station RP4 is deleted from the peripheral base station table 102 (Step S19).

As a result of the above operation, each base station stored in the peripheral base station table 102 is a base station whose signal quality exceeds the predetermined threshold. In the non-measured base station table 202, meanwhile, base stations that are not measured are stored together with a timer counter for a non-measured timer which measures the time period for which measurement of each base station is suspended.

The timer counter stored in the non-measured base station table 202 is referred to and it is judged whether a time out has occurred for a non-measured timer (Step S20). When a time out has occurred ("Yes" in Step S20), all of the base stations for which the time out has occurred (in the present case, only base station RP4) are deleted from the non-measured base station table 202 and are returned to the measured base station table 101 so that the measurement of the signal quality of these base stations will be recommenced (Step S21).

The number of base stations stored in the measured base station table 101 is next obtained (Step S22), and this number is compared with a predetermined lower limit (Step S23). When the number of base stations is below the lower limit ("Yes" in Step S23), the timer counter of the non-measured base station table 202 is referred to and the base station with the non-measured timer that has the shortest remaining time (base station RP8 in the present case) is deleted from the non-measured base station table 202, the non-measured timer of base station RP8 is stopped, and base station RP8 is restored to the measured base station table 101 (Step S24).

The number of base stations stored in the measured base station table 101 is next compared with a predetermined upper limit (Step S26), and the processing in Steps S24 to S26 is repeated until the number of base stations in the measured base station table 101 reaches the upper limit.

When the number of base stations is equal to or above the lower limit in Step S23 or equal to the upper limit in Step S26, the measured base station selecting unit 110 refers to the measured base station table 101 and selects base station RP5 as the next base station to be measured ("Next station present" in Step S27), clears the sampling iteration number T (Step S28), and has the processing in Steps S13 to S28 repeated for base station RP5. After measurement has been performed for the final base station RP9 in the measured base station table 101 ("No next station" in Step S27), the measurement is repeated starting from base station RP4 which is stored at the top of the measured base station table 101 (Steps S11 to S28).

With the present embodiment described above, the number judging unit 314 adds base stations to the measured base station table 101 so that the number of base stations in the measured base station table 101 can be maintained within a predetermined range. As a result, it is possible to avoid situations when the mobile communication apparatus is positioned at a location with poor signal reception, where measurement for many base stations is suspended and the number of measured base stations reduced, meaning that selection of a base station is not possible.

Fourth Embodiment

While in the first to third embodiments, the base station with the highest signal quality is unconditionally selected, this fourth embodiment is characterized by selecting not simply the base station with the highest signal quality, but by invalidating a selection of a base station if its signal quality fails to reach a second threshold and instead selecting a base station whose signal quality is expected to be the highest after a given time.

Figure 6:
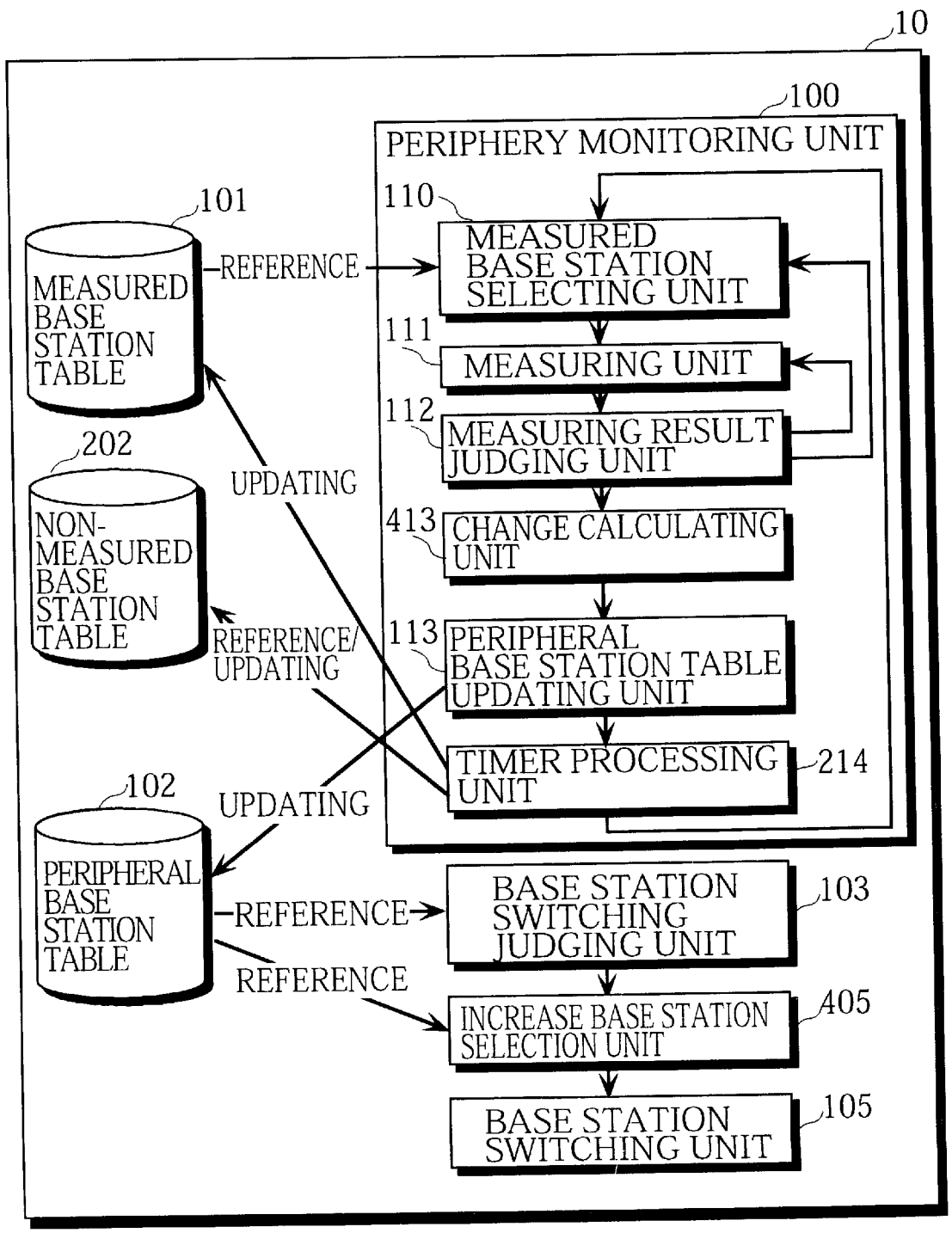
FIG. 6 is a block diagram showing the construction of the base station designating unit 10 in the fourth embodiment of the present invention.

FIG. 6 is a block diagram showing the construction of the mobile communication apparatus of the fourth embodiment. The internal construction of the mobile communication apparatus of the fourth embodiment is similar to that of the second embodiment in that it includes a measured base station selecting unit 110, a measuring unit 111, a measuring result judging unit 112, a base station switching judging unit 103, and a base station switching unit 105. However, the mobile communication apparatus of the fourth embodiment includes an increase base station selection unit 405 in place of the base station selecting unit 104 of the second embodiment, and further includes a change calculating unit 413.

When the measuring result judging unit 112 judges that the measuring result is not that measurement should be halted due to low signal quality, the change calculating unit 413 calculates differences in the multiple measurements of signal quality to find a change in the measured result which it reports to the peripheral base station table updating unit 113. As one example, when the RSSI measured by the measuring unit 111 is P1 for the first measurement, P2 for the second measurement, P3 for the third measurement, and P4 for the fourth measurement, the change calculating unit 413 calculates the differences P2–P1, P3–P2, P4–P3, P5–P4 . . . and by doing so finds the changes in the measured values □1, □2, □3, □4 . . . These changes in the measured values □1, □2, □3, □4 . . . are then used to determine a change level which shows whether the signal quality for the base station in question is on the increase or on the decrease.

The peripheral base station table updating unit 113 rearranges the content of the peripheral base station table 102 into descending order of signal quality, based on the information stored in the peripheral base station table 102 and on the measurement judging result including the change level in RSSI reported by the change calculating unit 413. The content of the peripheral base station table 102 after updating by the peripheral base station table updating unit 113 is shown in FIG. 20. As shown in FIG. 20, the peripheral base station table 102 stores a list of frequency bands of base stations that have been extracted from the measured base station table 101 due to their signal quality exceeding a predetermined threshold, along with corresponding RSSIs, QIs and change levels.

When instructed by the base station switching judging unit 103 to select a base station, the increase base station selection unit 405 refers to the information stored in the peripheral base station table 102 and selects the base station with the highest signal quality, before comparing the signal quality of the selected base station with a predetermined second threshold. When the signal quality exceeds the second threshold, the increase base station selection unit 405 informs the base station switching unit 105 of the selected base station as the base station to be used.

When the signal quality of the selected base station is equal to or below the second threshold, the change levels stored in the peripheral base station table 102 are compared for different base stations and a base station with the most marked increase in the thirty measured samples is selected, with the increase base station selection unit 405 informing the base station switching unit 105 of this newly selected base station.

Figure 13:
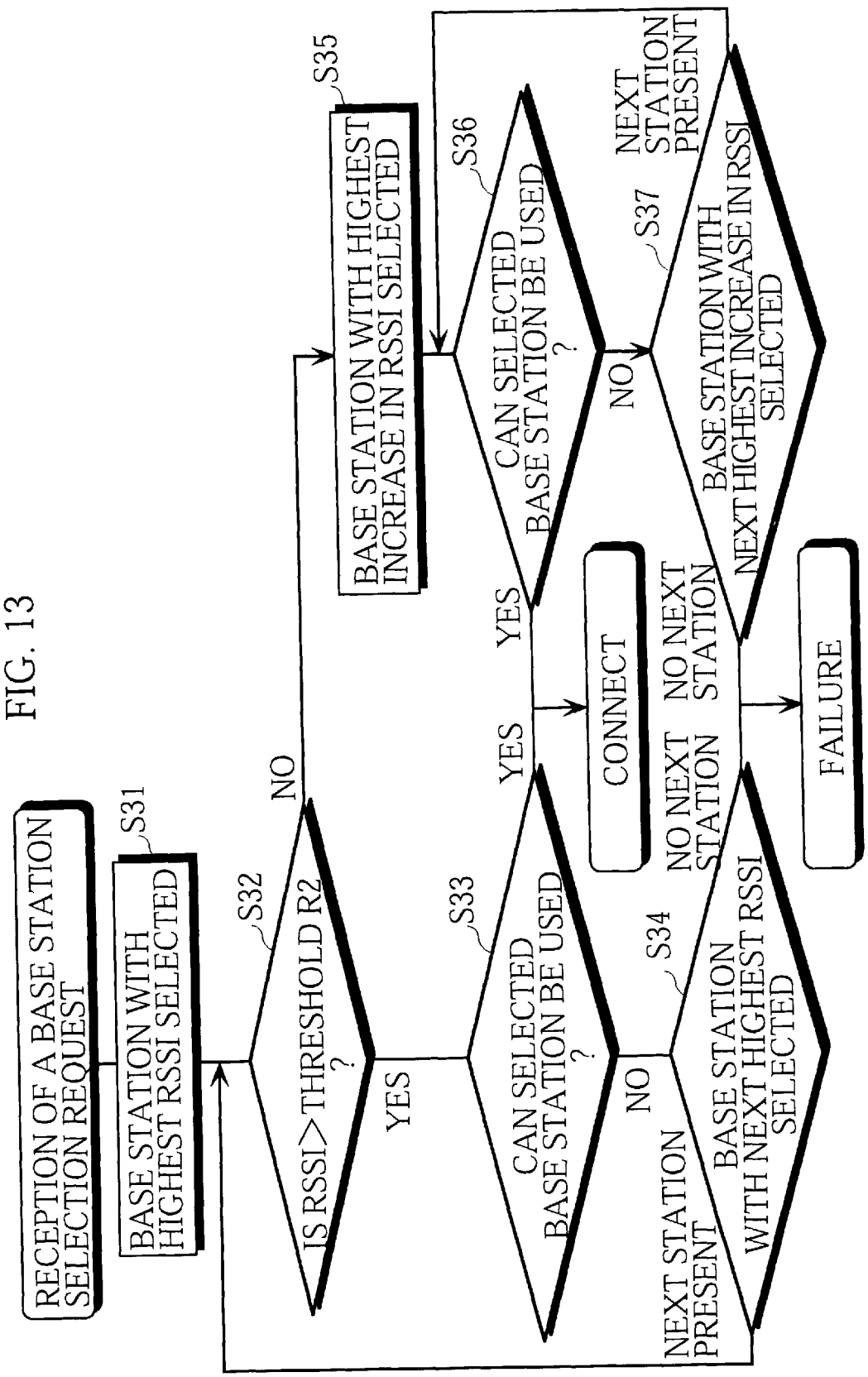
FIG. 13 is a flowchart showing a specific procedure for a control operation by the increase base station selection unit 405 shown in FIG. 6.

FIG. 13 is a flowchart showing the control procedure of the mobile communication apparatus of this fourth embodiment. The following is a description of the operation when the increase base station selection unit 405 shown in FIG. 6 selects a base station to be used when performing a call connect or handover, with reference to the flowchart in FIG. 13. In this example, the operating state is as shown in FIG. 1, so that the mobile communication apparatus is located within the radio zone f1 of base station RP1 with which it is in radio communication. In such a case, the peripheral radio stations are base stations RP4 to RP7. The peripheral base station table 102, meanwhile, stores the signal quality information composed of signal quality and change levels for each base station measured by the periphery monitoring unit 100, with the signal quality for all of the included base stations exceeding the predetermined thresholds R1 and Q1. In descending order of signal quality, base stations RP4, RP5, RP6, . . . RP9 are stored in the periphery base station table 102, and of these, the signal quality of base stations RP5 to RP9 are below the threshold R2 (where R1<R2).

When a base station selection request is received from the base station switching judging unit 103, the measured base station selecting unit 110 refers to the peripheral base station table 102 and selects base station RP4 with the highest signal quality that is stored at the top of the peripheral base station table 102 (Step S31).

The signal quality of the selected base station RP4 is compared with the predetermined threshold R2 for the mobile communication apparatus (Step S32). When the signal quality exceeds the threshold R2 ("Yes" in Step S32), unused slots of base station RP4 are detected, and when it is possible to use the detected unused slots ("Yes" in Step S33), base station RP4 is selected as the base station to be used for the call connect or handover. The switching process is then performed using the selected base station RP4.

On the other hand, when base station RP4 cannot be used ("No" in Step S33), the measured base station selecting unit 110 refers to the peripheral base station table 102 and selects base station RP5 which has the next highest signal quality ("Next present" in Step S34) and repeats the comparison of the signal quality of the selected base station RP5 with the threshold R2 (Steps S32 to S34). When the final base station in the peripheral base station table 102 has been judged as not being usable ("No next" in Step S34), the selection of a base station to be used when performing a call connect or handover is judged to have failed, and communication via the present base station, base station RP1, is continued.

When the signal quality of a selected base station (such as when base station RP5 is selected in Step S34) is below the threshold R2 ("No" in Step S34), the base station (here, base station RP8) with the highest increase in signal quality is selected out of all of the base stations stored in the peripheral base station table 102. In descending order of increase in signal quality, the content of the peripheral base station table 102 is base station RP8, base station RP9, base station RP5 . . .

Unused slots are detected for the selected base station RP8 and when it is possible to use the detected slots ("Yes" in Step S36), base station RP8 is selected as the base station to be used for a call connect or handover and the switching process for base station RP8 is performed.

On the other hand, when it is not possible to use base station RP8, ("No" in Step S36), the peripheral base station table 102 is referred to and the base station with the next highest increase, base station RP9, is selected ("Next station present" in Step S37). The judgement as to whether the selected base station can be used is then performed for base station RP9 (Steps S36 to S37), and when it is judged that the final base station in the peripheral base station table 102 cannot be used ("No next station" in Step S37), the selection of a base station to be used for a call connect or handover is judged to have failed, so that communication via the present base station, base station RP1, is continued.

By means of the present embodiment, the base station with the highest increase in signal quality is selected when no base station with a signal quality in excess of the second threshold can be used, so that a base station located in the general direction in which the mobile communication apparatus is presently travelling can be selected. By doing so, base stations whose signal quality will improve in a given time can be predicted and selected for use.

Fifth Embodiment

Figure 7:
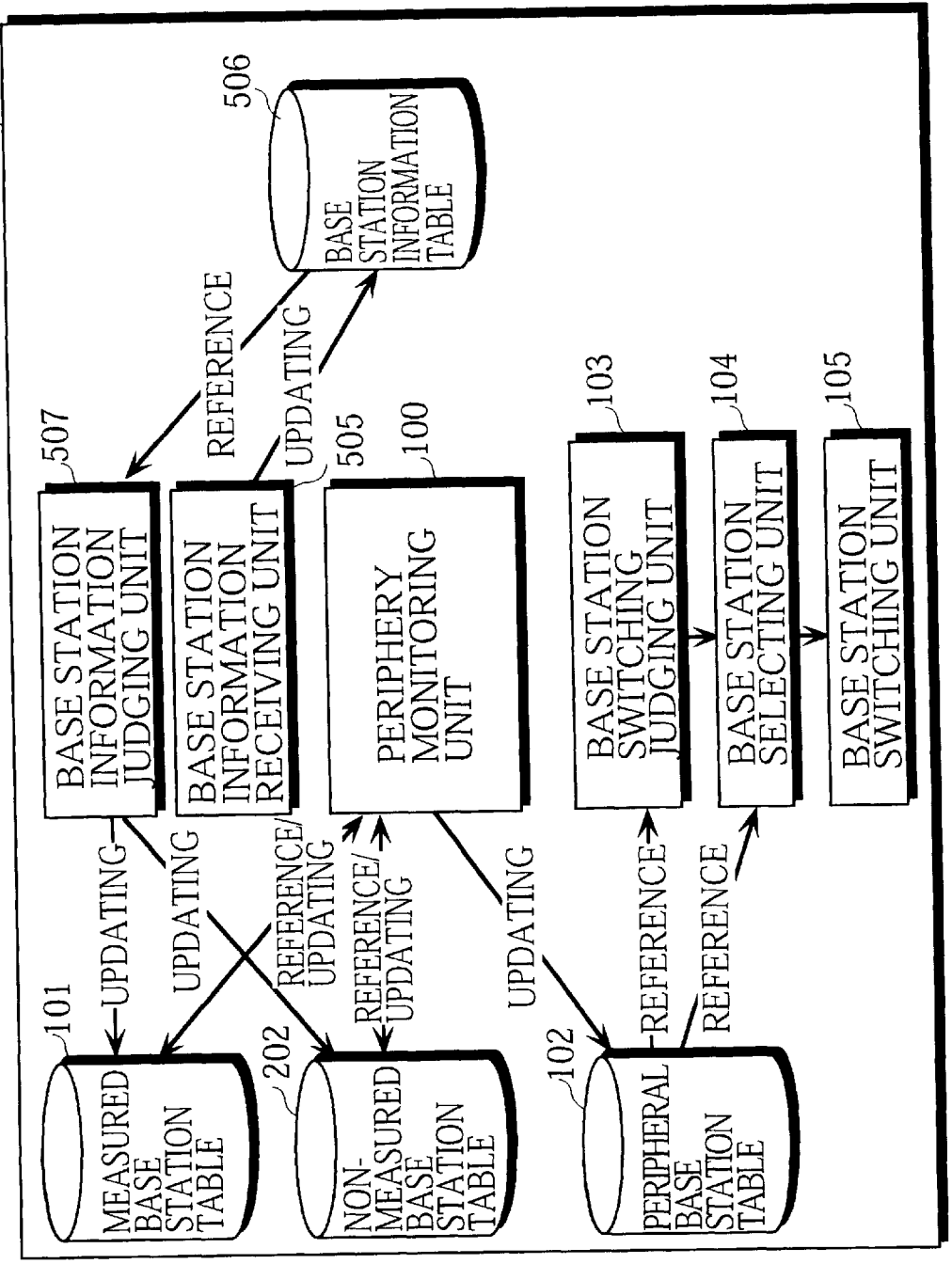
FIG. 7 is a block diagram showing the construction of the base station designating unit 10 in the fifth embodiment of the present invention.

The fifth embodiment of the present invention is characterized by setting base stations as non-measured base stations if they are not controlled by a communication service to which the present mobile communication apparatus has subscribed, regardless of whether the base stations have the highest RSSI, for example. FIG. 7 is a block diagram showing the construction of the mobile communication apparatus of the fifth embodiment. As shown in FIG. 7, the mobile communication apparatus is composed of a periphery monitoring unit 100, a measured base station table 101, a peripheral base station table 102, a base station switching judging unit 103, a base station selecting unit 104, and a base station switching unit 105, in the same way as the construction of the second embodiment. However, the mobile communication apparatus of the fifth embodiment is unique in that it is further composed of a base station information receiving unit 505, a base station information table 506, and a base station information judging unit 507.

The base station information receiving unit 505 stores control messages received from each base station via a control channel during standby and information relating to a present base station included in communication messages received during communication processing via a communication channel in the base station information table 506.

The base station information table 506 stores base station information that includes identifiers for base stations that are supplied by the base stations themselves, information regarding the base station control apparatus that controls each base station, and information about the systems that are providing communication services.

The base station information judging unit 507 refers to the base station information stored in the base station information table 506 and judges whether each base station stored in the measured base station table 101 is a base station that is contracted to a same communication service system as the present mobile communication apparatus. The base station information judging unit 507 deletes base stations that are not contracted to the same communication service system from the measured base station table 101, adds them to the non-measured base station table 202, and activates a non-measured timer for each of these base stations.

With the present embodiment, base stations that are not contracted to the same communication service as the present mobile communication apparatus are deleted from the list of potential base stations, so that operations whereby a base station of a different communication service are selected can be fundamentally prevented.

Sixth Embodiment

Figure 8:
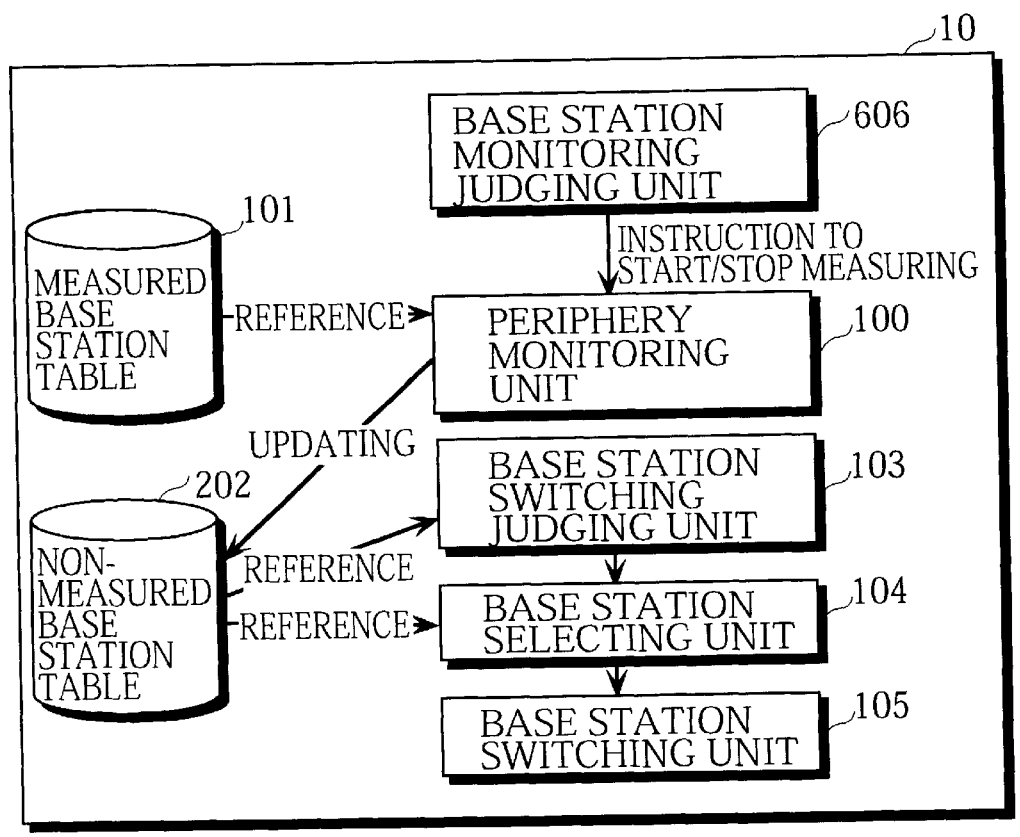
FIG. 8 is a block diagram showing the construction of the base station designating unit 10 in the sixth embodiment of the present invention.

The sixth embodiment of the present invention is characterized by restricting the measurement of signal quality of other base stations to only occasions when there appears to be deterioration in the radio communication with a present base station. FIG. 8 is a block diagram showing the construction of the mobile communication apparatus of the sixth embodiment of the present invention. As shown in FIG. 8, the present mobile communication apparatus is composed of a periphery monitoring unit 100, a measured base station table 101, a peripheral base station table 102, a base station switching judging unit 103, a base station selecting unit 104, and a base station switching unit 105 in the same way as the mobile communication apparatus described in the first embodiment. The mobile communication apparatus of this sixth embodiment differs, however, in that it further includes a base station monitoring judging unit 606.

The base station monitoring judging unit 606 compares the signal quality of the base station being used in communication with a predetermined higher and lower limit. When the signal quality is equal to or below the lower limit, the signal quality is judged to have deteriorated, and the periphery monitoring unit 100 is informed so that the measurement of the signal quality of other base stations can be commenced. When the signal quality exceeds the higher limit, the radio communication is judged to have sufficiently recovered, and so the periphery monitoring unit 100 is informed so that the measurement of the signal quality of other base stations can be terminated.

On being informed by the base station monitoring judging unit 606 of deterioration in the radio communication, the periphery monitoring unit 100 starts to measure the signal quality of the base stations stored in the measured base station table 101 and rearranges the content of the peripheral base station table 102 in terms of the signal quality of the base stations. By repeatedly selecting a next base station from the measured base station table 101 and so changing the base station whose signal quality is measured, the signal quality of all of the peripheral base stations is measured. On being informed by the base station monitoring judging unit 606 of a recovery in the radio communication, however, the periphery monitoring unit 100 terminates the measurement of signal quality of other base stations.

By means of the present embodiment, when the mobile communication apparatus is located near the base station being used for communication and is stationary or moving slowly, the signal quality for the channel presently being used will be high, so that measurement of signal quality is not performed for other base stations. Measurement of signal quality is commenced for other base stations only when the signal quality of the channel currently being used for communication deteriorates, such as due to the mobile communication apparatus moving to a location where reception on the present channel is poor. As a result, the operation of the periphery monitoring unit 100 is restricted by the signal quality of the present communication, so that unnecessary operations by the mobile communication apparatus can be avoided.

Seventh Embodiment

The seventh embodiment is characterized by giving priority when selecting a new base station to base stations under the control of a same base station control apparatus as the base station currently being used for communication.

Figure 9:
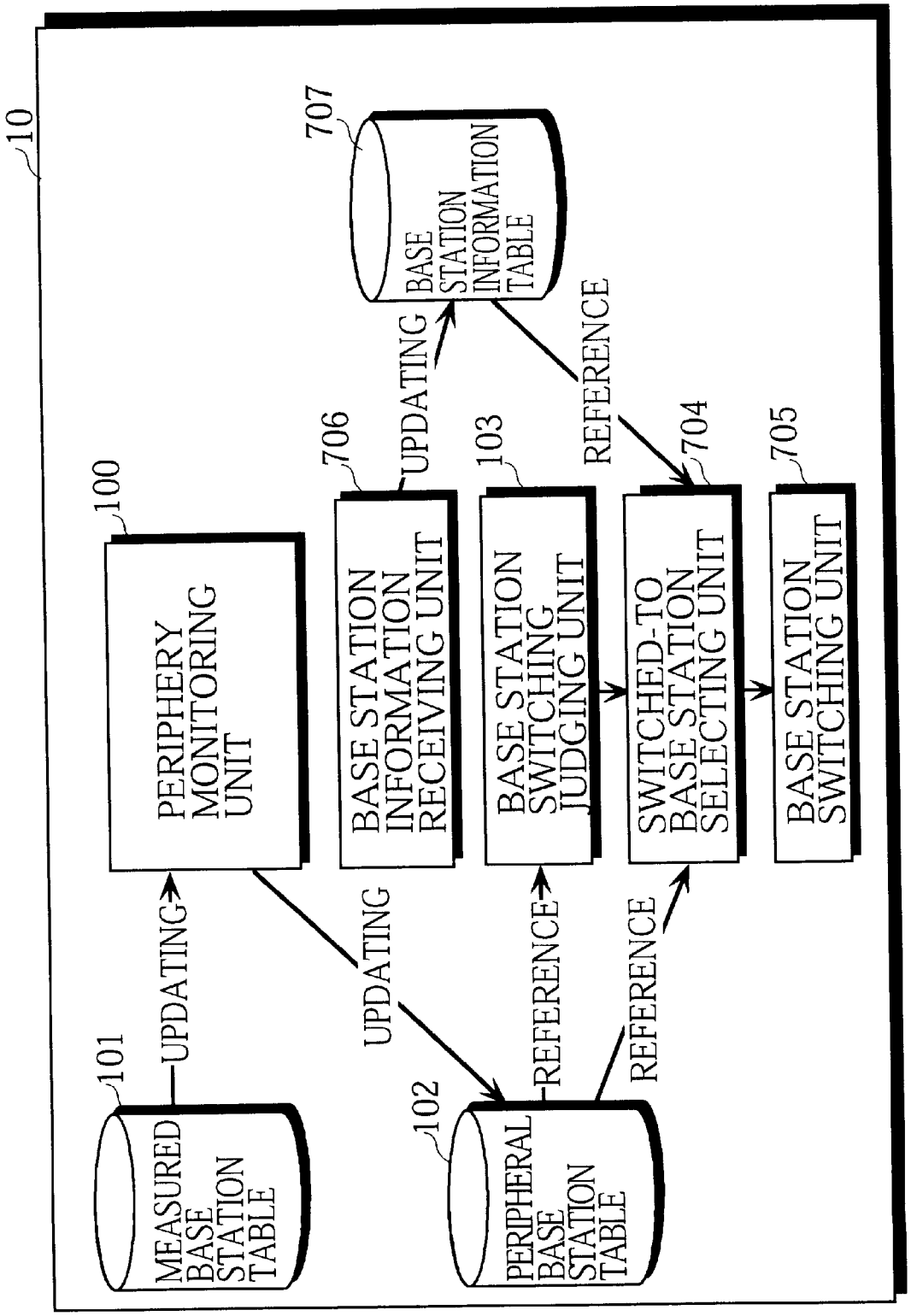
FIG. 9 is a block diagram showing the construction of the base station designating unit 10 in the seventh embodiment of the present invention.

FIG. 9 is a block diagram showing the construction of the mobile communication apparatus in the seventh embodiment of the present invention. As shown in FIG. 9, the present mobile communication apparatus is composed of a periphery monitoring unit 100, a measured base station table 101, a peripheral base station table 102, and a base station switching judging unit 103 in the same way as the mobile communication apparatus shown in FIG. 4, but also includes a base station information receiving unit 706 and a base station information table 707. The base station selecting unit 104 and base station switching unit 105 shown in FIG. 4 have also been replaced by the switching base station selection unit 704 and the base station switching unit 705.

The base station information receiving unit 706 stores control messages received from each base station via a control channel during waiting and information relating to a present base station included in communication messages received during communication processing via a communication channel into the base station information table 707.

The base station information table 707 stores base station information that includes identifiers for base stations that are supplied by the base stations themselves, information regarding the base station control apparatus that controls each base station, and information about the systems that are providing communication services. However, the base station information table 707 does not need to store information relating to all of the base stations stored in the peripheral base station table 102.

On being requested by the base station switching judging unit 103 to select a base station, the switching base station selection unit 704 refers to the information stored in the peripheral base station table 102 and the base station information stored in the base station information table 707, and judges whether there is a base station which has a signal quality that exceeds a predetermined threshold and which is under the control of the same base station control apparatus as the base station presently being used for communication. When such a base station is present, a base station with the highest signal quality out of the base stations under the control of the same base station control apparatus as the presently used base station is selected as the base station to be used for the call connect or handover.

When there is no base station under the control of the same base station control apparatus with a sufficiently high signal quality, a base station with the highest signal quality is selected out of the other base stations as the base station to be used for the call connect or handover, and is reported to the base station switching unit 705 as the selected base station.

On being informed of a selected base station by the switching base station selection unit 704, the base station switching unit 705 performs the switching process for the base station selected for use in the call connect or handover so that it is used for communication.

Figure 14:
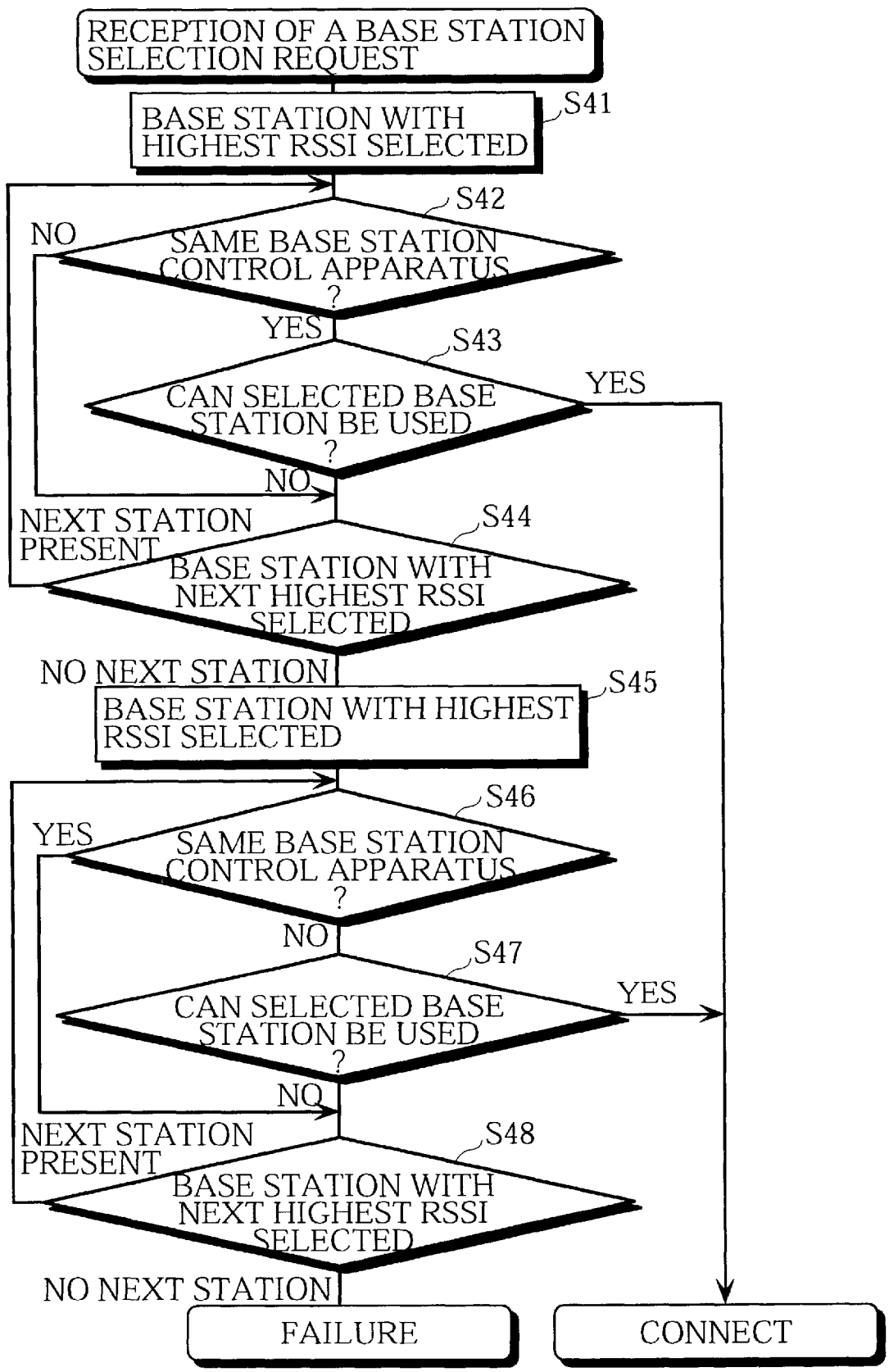
FIG. 14 is a flowchart showing a specific procedure for a control operation by the switched-to base station selection unit 704 shown in FIG. 9.

FIG. 14 is a flowchart showing the control procedure for the mobile communication apparatus of the seventh embodiment. The following is a description of how the switching base station selection unit 704 selects a base station to be used for a call connect or handover. In this example, the operating state is as shown in FIG. 1, so that the mobile communication apparatus is located within the radio zone f1 of base station RP1 with which it is in radio communication. In such a case, the peripheral radio stations are base stations RP4 to RP7.

In the initial state, signal quality information for each of the base stations measured by the periphery monitoring unit 100 is stored in the peripheral base station table 102, with the signal quality of each of the base stations exceeding the predetermined thresholds R1 and Q1. In descending order of signal quality, base station RP4, base station RP5, base station RP6, . . . base station RP9 are stored. When a request to select a base station is received from the base station switching judging unit 103, the switching base station selection unit 704 refers to the peripheral base station table 102 and selects base station RP4, which has the highest signal quality and so is stored at the top of the peripheral base station table 102, as the base station to be used as the base station for a call connect or handover (Step S41).

The switching base station selection unit 704 next refers to the base station information table 707 and compares the base station control apparatus that controls the base station selected for use as the base station for a call connect or handover with the base station control apparatus that controls base station RP1 currently being used for communication (Step S42).

When the base station control apparatuses are the same ("Yes" in Step S42), unused slots are detected for the selected base station and, when it is possible to use the detected slots ("Yes" in Step S43), the switching process is performed for the base station selected for use in the call connect or handover.

On the other hand, when the base station control apparatuses are different ("No" in Step S42) or when it is not possible to use the detected slots for the selected base station ("No" in Step S43), the switching base station selection unit 704 refers to the peripheral base station table 102 again and selects base station RP5, which has the next highest signal quality, as the base station to be used as the base station for a call connect or handover ("Next station present" in Step S44). The switching base station selection unit 704 then repeats the processing starting from the comparison of the base station control apparatus for the selected base station and the base station control apparatus that controls base station RP1 currently being used for communication (Steps S42–S43).

When the final base station stored in the peripheral base station table 102 has been judged as not being usable ("No next station" in Step S44), the switching base station selection unit 704 refers once again to the peripheral base station table 102 and selects the highest signal quality as the base station to be used for the call connect or handover (Step S45). The switching base station selection unit 704 next refers to the base station information table 506 and compares the base station control apparatus that controls the base station selected for use as the base station for the call connect or handover with the base station control apparatus that controls base station RP1 currently being used for communication (Step S46)

When the base station control apparatuses are different ("No" in Step S46), unused slots are detected for the selected base station and, when it is possible to use the detected slots ("Yes" in Step S47), the switching process is performed for the base station selected for use in the call connect or handover.

On the other hand, when the base station control apparatuses are the same("Yes" in Step S46) or when it is not possible to use the detected slots for the selected base station ("No" in Step S47), the switching base station selection unit 704 refers to the peripheral base station table 102 again and selects base station RP5, which has the next highest signal quality, as the base station to be used as the base station for the call connect or handover ("Next station present" in Step S48). The switching base station selection unit 704 then repeats the processing starting from the comparison of the base station control apparatus for the selected base station and the base station control apparatus that controls base station RP1 currently being used for communication (Steps S46–S47).

When the last base station in the peripheral base station table 102 has been judged as not being usable ("No next station" in Step S48), the selection of a base station to be used in the call connect or handover is judged to have failed and communication is continued via the present base station RP1.

With the present embodiment, priority is given to base stations that are controlled by the same base station control apparatus as the base station presently being used for communication, so that the time taken when a handover is actually performed can be reduced.

Eighth Embodiment

The eighth embodiment of the present invention is characterized by selecting a new base station after first judging whether a new base station is under the control of the same base station control apparatus as the base station presently being used for communication or is under the control of a different base station control apparatus, with the selection process for a new base station being halted when no suitable base station is present.

Figure 10:
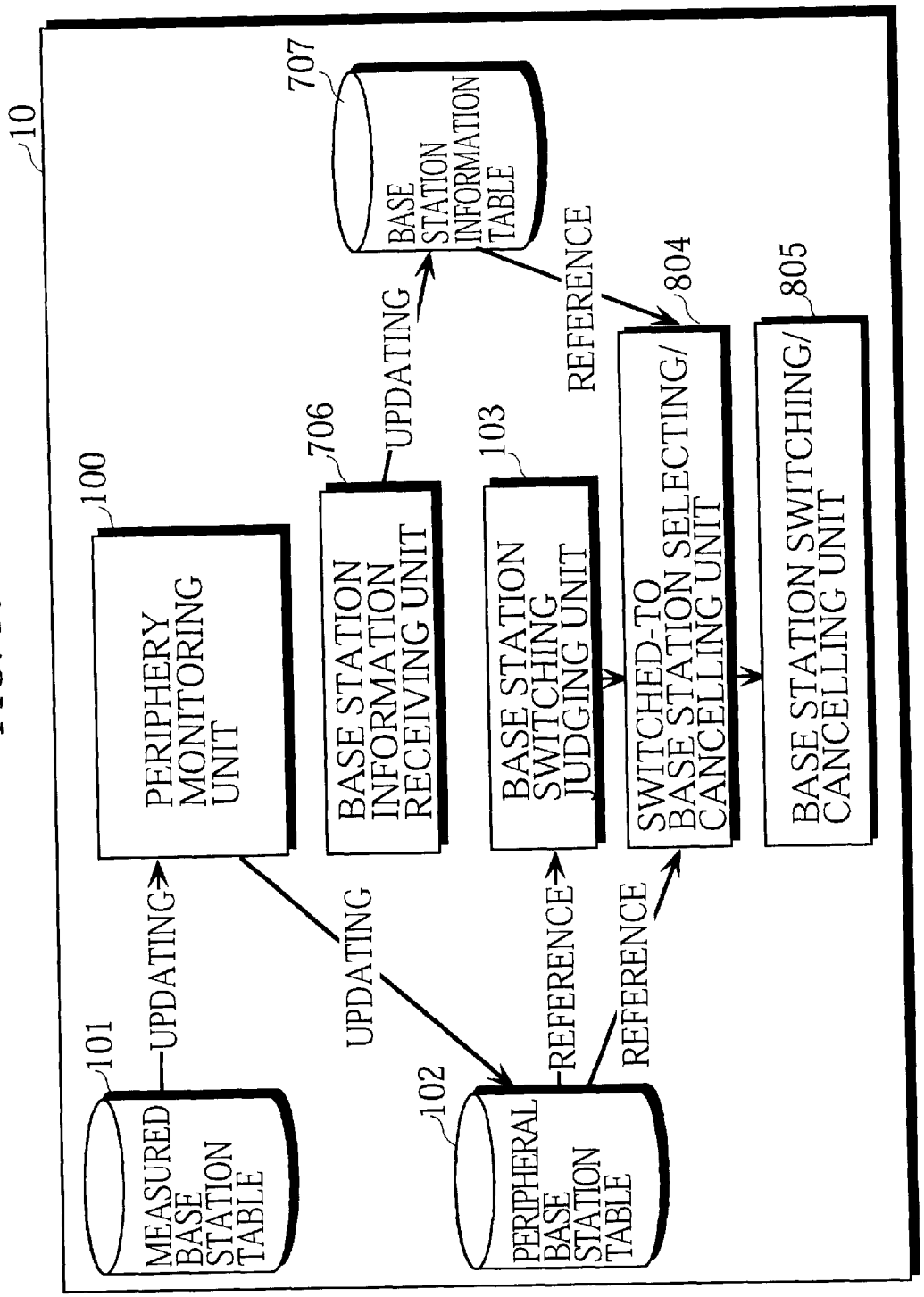
FIG. 10 is a block diagram showing the construction of the base station designating unit 10 in the eighth embodiment of the present invention.

FIG. 10 is a block diagram showing the construction of the mobile communication apparatus of the eighth embodiment of the present invention. As shown in the figure, the present mobile communication apparatus is composed of a periphery monitoring unit 100, a measured base station table 101, a peripheral base station table 102, a base station switching judging unit 103, a base station information receiving unit 706, and a base station information table 707 in the same way as the mobile communication apparatus of the seventh embodiment shown in FIG. 9. However, the mobile communication apparatus of the eighth embodiment differs in that it includes a switched-to base station selecting/cancelling unit 804 and a base station switching/cancelling unit 805 in place of the switching base station selection unit 704 and the base station switching unit 705.

On being requested by the base station switching judging unit 103 to select a base station, the switched-to base station selecting/cancelling unit 804 selects a next base station to be used based on the connection relationships between the base stations and the base station control apparatuses. The connection relationships between the base stations and the base station control apparatuses have the following three patterns. In pattern (1), a base station that has a signal quality that exceeds the threshold and is under the control of the same base station control apparatus as the present base station is present. In pattern (2), only base stations for which the base station control apparatus is unknown and base stations for a different base station control apparatus are present. In pattern (3), only base stations for a different base station control apparatus are present.

Information regarding the base stations and base station control apparatuses is stored in the peripheral base station table 102 and in the base station information table 707, so that the switched-to base station selecting/cancelling unit 804 can select the base station to be used by searching the peripheral base station table 102 and the base station information table 707 using the present base station as the search key.

For pattern (1), signal quality is compared for the base stations under the control of the same base station control apparatus, and base station with the highest measured signal quality is selected as the base station to be used as the base station for the call connect or handover.

For pattern (2), the switched-to base station selecting/cancelling unit 804 ignores the base stations which are under the control of a different base station control apparatus, selects the base station out of the remaining base stations, which is to say the base stations whose base station control apparatus is unknown, which has the highest signal quality as the base station to be used for the call connect or handover, and informs the base station switching/cancelling unit 805 of the selected base station.

For pattern (3), the switched-to base station selecting/cancelling unit 804 terminates the switching of base station, so that the communication is continued via the present base station.

On being informed by the switched-to base station selecting/cancelling unit 804 of the base station to be used for the call connect or handover, the base station switching/cancelling unit 805 performs the processing for switching to using the selected base station for communication. When the base station switching/cancelling unit 805 judges, from the information relating to the base station used for the call connect or handover that is included in a communication message received during processing, that the base station indicated by the switched-to base station selecting/cancelling unit 804 is under the control of a different base station control apparatus to the present base station, the switching of base station is canceled and communication is continued via the present base station.

With the present embodiment, the time taken when a handover is actually performed can be reduced by only selecting base stations under the control of the same base station control apparatus as the present base station.

The present invention has been explained by means of the embodiments given above, although it should be obvious that the present invention is not limited to these. Modifications, such as those given below, also are possible.

It should be obvious that the periphery monitoring unit in the fifth to eighth embodiments can be constructed in the same way as the periphery monitoring unit in the first to fourth embodiments. The embodiments also describe the case when an average is taken for signal quality, although a sum-of-products value or other statistical value may otherwise by calculated.

In the first to eighth embodiments, the signal quality measured by the periphery monitoring unit was described as the RSSI and QI, although other values may be measured. The mobile communication apparatus was also described as monitoring the peripheral base stations during communication, although it may also monitor the peripheral base stations during standby. The selection of a base station to be used in a handover was also described as being performed at the request of the base station switching judging unit, although it is also possible for such selection to be performed in accordance with a user indication or an indication from a base station. It is further possible for a base station used during communication to be selected not during communication but during standby.

In the seventh embodiment, the information stored in the base station information table was described as being base station identifiers, information for the base station control apparatus controlling the base station, and information for the system performing the service, although it should be obvious that other information may be added, such as area information. It is also possible to construct the mobile communication apparatus so that the information in the base station information table is regularly updated.

By adding the base station monitoring judging unit of the sixth embodiment to the constructions of the seventh and eighth embodiments, it is possible for these embodiments to only monitor the peripheral base stations when the radio communication with the present base station has deteriorated slightly.

Finally, while the use of the two synthesizers shown in FIG. 2 is described, it should be clear that these can be achieved by a single synthesizer that switches between different frequencies.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A mobile communication apparatus, used in a mobile communication system, that measures signal quality of each radio channel assigned to each of a plurality of base stations and determines a base station to be used in communication based on a measuring result, each base station providing information as to a base station control apparatus that manages the base station in a communication service, the mobile communication apparatus comprising:

base station control apparatus storing means for storing information indicating a base station control apparatus which controls base stations for a communication service used by the mobile communication apparatus;

candidate storing means for storing a plurality of radio channels that have been assigned to a plurality of base stations whose signal quality is to be measured;

detecting means for referring to the information about base station control apparatuses provided by each base station and, out of the base stations stored in the candidate storing means, detecting radio channels that have been assigned to base stations that are controlled by a base station control apparatus that is not a base station control apparatus indicated by the information stored in the base station control apparatus storing means;

deleting means for deleting the radio channels detected by the detecting means from the candidate storing means;

first signal quality measuring means for measuring signal quality on each radio channel stored in the candidate storing means after deletion has been performed by the deleting means;

determining means for comparing the signal quality measured by the first signal quality measuring means for each radio channel in the candidate storing means and, based on a comparison result, determining a radio channel with a highest signal quality as a base station to be used in communication.

2. The mobile communication apparatus of claim 1, wherein the determining means includes:

a summing unit for summing all measurements of signal quality for a same radio channel;

an averaging unit for calculating an average signal quality for each radio channel whose signal quality has been measured a number of times equal to the predetermined iteration number, using a summed value calculated by the summing unit and the predetermined iteration number; and a first determining unit for determining that a base station with a highest average calculated by the averaging unit should be used in communication.

3. The mobile communication apparatus of claim 2, wherein the first signal quality measuring means includes:

a measuring unit for measuring at least one of a received signal strength indicator (hereinafter, "RSSI") of a selected radio channel and a quality indicator (hereinafter "QI") expressed as a center symbol of a received burst on the selected radio channel as the signal quality of the radio channel, wherein the first judging means includes:

a comparing unit for judging whether the signal quality of the selected radio channel meets the predetermined quality standard by comparing at least one of the RSSI and the QI measured by the measuring unit with a predetermined threshold.

4. A mobile communication apparatus, used in a mobile communication system, that measures signal quality of each radio channel assigned to each of a plurality of base stations and determines a base station to be used in communication based on a measuring result, the mobile communication apparatus comprising:

first signal quality measuring means for measuring signal quality of a base station currently being used in communication;

comparing means for comparing the signal quality measured by the first signal quality measuring means with a measurement commencement threshold and a measurement termination threshold; and second signal quality measuring means for measuring signal quality of base stations aside from the currently used base station when the signal quality measured by the first signal quality measuring means is lower than the measurement commencement threshold and for terminating a measurement of the signal quality of the base stations aside from the currently used base station when, after measurement of signal quality has commenced for base stations aside from the currently used base station, the signal quality measured by the first signal quality measuring means is higher than the measurement termination threshold.

5. The mobile communication apparatus of claim 4, wherein the first signal quality measuring means and the second signal quality measuring means each include:

a measuring unit for measuring at least one of a received signal strength indicator (hereinafter, "RSSI") of a selected radio channel and a quality indicator (hereinafter "QI") expressed as a center symbol of a received burst on the selected radio channel as the signal quality of the radio channel, wherein the comparing means compares the signal quality of a radio channel with the measurement commencement threshold and the measurement termination threshold by comparing at least one of the RSSI and the QI measured by the measuring unit with a predetermined threshold for each of the measurement commencement threshold and the measurement termination threshold.

6. A mobile communication apparatus, used in a mobile communication system, that measures signal quality of each radio channel assigned to each of a plurality of base stations and determines a base station to be used in communication based on a measured result, each base station providing information as to a base station control apparatus that manages the base station in a communication service, the mobile communication apparatus comprising:

base station control apparatus storing means for storing information indicating a base station control apparatus which controls base stations for a communication service used by the mobile communication apparatus;

candidate storing means for storing the plurality of radio channels that have been assigned to a plurality of base stations whose signal quality is to be measured;

first judging means for referring to the information about base station control apparatuses provided by each base station and judging which base station control apparatus controls each base station; and switched-to base station selecting means for preferentially selecting a radio channel with a highest signal quality based on the judging result and the information stored in the base station control apparatus storing means, out of radio channels that are assigned to other base stations which are controlled by the same base station control apparatus controlling the base station for a current communication.

7. The mobile communication apparatus of claim 6, wherein the switched-to base station selecting means selects a radio channel with a highest signal quality, out of radio channels that are assigned to base stations judged by the first judging means to be controlled by a base station control apparatus that cannot be identified, when the first judging means judges that there is no base station which is controlled by the base station control apparatus indicated by the information stored in the base station control apparatus storing means.

8. The mobile communication apparatus of claim 7, wherein the switched-to base station selecting means cancels a switching of base station when the first judging means judges that there is no base station which is controlled by the base station control apparatus indicated by the information stored in the base station control apparatus storing means and judges that only base stations controlled by other base station control apparatuses are present.

9. The mobile communication apparatus of claim 8, wherein the signal quality measuring means includes:
a measuring unit for measuring at least one of a received signal strength indicator (hereinafter, "RSSI") of a selected radio channel and a quality indicator (hereinafter "QI") expressed as a center symbol of a received burst on the selected radio channel as the signal quality of the radio channel.

10. A mobile communication apparatus, used in a mobile communication system, that measures signal quality of each radio channel assigned to each of a plurality of base stations and determines a base station to be used in communication based on a measured result, each base station providing information as to a base station control apparatus that manages the base station in a communication service,
the mobile communication apparatus comprising:
a base station control apparatus storing unit for storing information indicating a base station control apparatus which controls base stations for a communication service used by the mobile communication apparatus;
a judging unit for referring to the information about base station control apparatuses provided by each base station and judging which base station control apparatus controls each base station; and
a switched-to base station selecting unit for preferentially selecting a radio channel with a highest signal quality out of radio channels that are assigned to other base stations controlled by the same base station control apparatus controlling the base station for a current communication based on the judging result and the information stored in the base station control apparatus storing unit.

11. The mobile communication apparatus of claim 10, wherein the switched-to base station selecting unit selects a radio channel with a highest signal quality, out of radio channels that are assigned to base stations judged by the judging unit to be controlled by the base station control apparatus that cannot be identified, when the judging unit judges that there is no base station which is controlled by the base station control apparatus indicated by the information stored in the base station control apparatus storing unit.

12. The mobile communication apparatus of claim 11, wherein the switched-to base station selecting unit cancels a switching of a base station when the judging unit judges that there is no base station which is controlled by the base station control apparatus indicated by the information stored in the base station control apparatus storing unit and judges that only base stations controlled by other base station control apparatuses are present.

13. The mobile communication apparatus of claim 12, further comprising a measuring unit for measuring at least one of a received signal strength indicator (RSSI) of a selected radio channel and a quality indicator (QI) expressed as a center symbol of a received burst on the selected radio channel as the signal quality of the radio channel.

* * * * *